United States Patent
Lee et al.

(10) Patent No.: US 9,304,290 B2
(45) Date of Patent: Apr. 5, 2016

(54) IMAGING LENS, AND ELECTRONIC APPARATUS INCLUDING THE SAME

(71) Applicant: Genius Electronic Optical Co., Ltd., Taichung (TW)

(72) Inventors: Poche Lee, Taichung (TW); Tzu-Chien Tang, Taichung (TW); Chih-Yang Yeh, Taichung (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 76 days.

(21) Appl. No.: 14/261,718

(22) Filed: Apr. 25, 2014

(65) Prior Publication Data
US 2015/0168675 A1 Jun. 18, 2015

(30) Foreign Application Priority Data
Dec. 18, 2013 (TW) ............................. 102146945 A

(51) Int. Cl.
*G02B 9/60* (2006.01)
*G02B 13/00* (2006.01)
*G02B 13/06* (2006.01)

(52) U.S. Cl.
CPC .............. *G02B 9/60* (2013.01); *G02B 13/0045* (2013.01); *G02B 13/06* (2013.01)

(58) Field of Classification Search
CPC ......... G02B 9/60; G02B 9/62; G02B 13/0045
USPC ........................... 359/713, 714, 763, 765, 766
See application file for complete search history.

(56) References Cited

U.S. PATENT DOCUMENTS

| | | | | |
|---|---|---|---|---|
| 8,000,031 B1* | 8/2011 | Tsai | ................... | G02B 13/0045 359/714 |
| 2008/0144193 A1* | 6/2008 | Adachi | ................... | G02B 9/60 359/770 |
| 2012/0019937 A1* | 1/2012 | Ishihara | ................. | B82Y 20/00 359/793 |
| 2012/0069140 A1* | 3/2012 | Tsai | ................... | G02B 13/0045 348/36 |
| 2012/0092778 A1* | 4/2012 | Tsai | ................... | G02B 13/0045 359/714 |
| 2012/0206627 A1* | 8/2012 | Reshidko | ........... | G02B 13/0045 348/240.2 |
| 2012/0275037 A1* | 11/2012 | Kubota | .................. | G02B 13/04 359/753 |
| 2012/0307382 A1* | 12/2012 | Hsu | .................... | G02B 13/0045 359/770 |
| 2013/0182335 A1* | 7/2013 | Tsai | ................... | G02B 13/0045 359/714 |
| 2013/0258185 A1* | 10/2013 | Chang | ................ | G02B 13/0045 348/374 |

* cited by examiner

*Primary Examiner* — Bumsuk Won
*Assistant Examiner* — William R Alexander
(74) *Attorney, Agent, or Firm* — Jianq Chyun IP Office

(57) ABSTRACT

An imaging lens includes first to fifth lens elements arranged from an object side to an image side in the given order. Through designs of surfaces of the lens elements and relevant lens parameters, a wide field of view of the imaging lens may be achieved while maintaining good optical performance.

17 Claims, 32 Drawing Sheets

| system focal length = 1.297mm, half field-of-view =82.695°, F-number =2 | | | | | | |
|---|---|---|---|---|---|---|
| surface | | radius of curvature | thickness | refractive index | Abbe number | material | focal length |
| | object | ∞ | | | | | |
| 31 | first lens element 3 | 67.016 | 7.083 | 1.517 | 64.141 | Glass | -28.165 |
| 32 | | 11.531 | 4.214 | | | | |
| 41 | second lens element 4 | 31.124 | 2.201 | 1.545 | 56.114 | plastic | -7.002 |
| 42 | | 3.314 | 5.759 | | | | |
| 51 | third lens element 5 | -7.432 | 5.384 | 1.642 | 23.265 | plastic | 13.006 |
| 52 | | -5.045 | 3.587 | | | | |
| | aperture stop 2 | ∞ | -0.005 | | | | |
| 61 | fourth lens element 6 | 16.881 | 0.659 | 1.642 | 23.265 | plastic | -7.575 |
| 62 | | 3.717 | 0.138 | | | | |
| 71 | fifth lens element 7 | 3.647 | 1.613 | 1.545 | 56.114 | plastic | 3.145 |
| 72 | | -2.728 | 0.713 | | | | |
| 81 | optical filter 8 | ∞ | 0.400 | | | | |
| 82 | | ∞ | 3.257 | | | | |
| | image plane 9 | ∞ | | | | | |

FIG.3

| surface | 41 | 42 | 51 | 52 |
|---|---|---|---|---|
| NRADIUS | 6.153399904 | 3.590371611 | 3.53285578 | 3.695852359 |
| K | 1.503E-10 | -2.844E-01 | 5.502E-01 | -3.388E-02 |
| a0 | 2.126E+00 | 1.392E+00 | -6.475E-02 | 3.346E-01 |
| a1 | -2.261E-01 | 1.537E-01 | -1.564E-02 | -6.103E-03 |
| a2 | 1.512E-03 | -8.401E-03 | -3.275E-03 | 3.475E-03 |
| a3 | -8.775E-04 | -8.216E-03 | -7.297E-05 | 3.081E-05 |
| a4 | 2.952E-04 | -3.077E-03 | -2.604E-04 | 1.898E-04 |
| a5 | 7.262E-05 | -1.810E-03 | 2.266E-05 | 7.697E-05 |
| a6 |  |  |  | -1.50E-06 |
| surface | 61 | 62 | 71 | 72 |
| NRADIUS | 1.352902874 | 1.740789097 | 2.044765254 | 2.259332212 |
| K | 4.112E-10 | 1.115E-01 | -2.142E-01 | 2.222E-02 |
| a0 | -3.580E-02 | -8.830E-02 | -8.071E-02 | 2.631E-01 |
| a1 | -4.903E-03 | -1.823E-02 | -2.058E-04 | 6.321E-02 |
| a2 | -7.464E-05 | 2.493E-03 | 1.474E-03 | 2.047E-03 |
| a3 | -3.719E-05 | 1.268E-03 | -9.978E-05 | -4.313E-03 |
| a4 | -1.944E-05 | 4.606E-04 | -3.556E-04 | 7.900E-04 |
| a5 | -7.952E-06 | -1.752E-04 | -9.055E-04 | 1.696E-03 |
| a6 | -8.580E-07 | -1.922E-04 | -4.026E-04 | 5.383E-04 |

| surface | | radius of curvature | thickness | refractive index | Abbe number | material | focal length |
|---|---|---|---|---|---|---|---|
| system focal length =1.600mm, half field-of-view =83.712°, F-number =2 ||||||||
| | object | ∞ | | | | | |
| 31 | first lens element 3 | 27.514 | 0.800 | 1.517 | 64.141 | Glass | -14.514 |
| 32 | | 5.837 | 4.349 | | | | |
| 41 | second lens element 4 | -28.887 | 1.458 | 1.545 | 56.114 | plastic | -7.903 |
| 42 | | 5.151 | 4.738 | | | | |
| 51 | third lens element 5 | -6.841 | 2.000 | 1.642 | 23.265 | plastic | 16.556 |
| 52 | | -4.638 | 5.565 | | | | |
| | aperture stop 2 | ∞ | -0.003 | | | | |
| 61 | fourth lens element 6 | 13.916 | 0.404 | 1.642 | 23.265 | plastic | -6.203 |
| 62 | | 3.061 | 0.100 | | | | |
| 71 | fifth lens element 7 | 2.907 | 1.291 | 1.545 | 56.114 | plastic | 2.996 |
| 72 | | -3.140 | 0.680 | | | | |
| 81 | optical filter 8 | ∞ | 0.400 | | | | |
| 82 | | ∞ | 4.409 | | | | |
| | image plane 9 | ∞ | | | | | |

| surface | 41 | 42 | 51 | 52 |
|---|---|---|---|---|
| NRADIUS | 5.668788832 | 3.590224569 | 3.596859401 | 3.949623932 |
| K | -1.382E-01 | -1.210E+00 | -4.661E-01 | 1.641E-02 |
| a0 | 1.502E+00 | 1.439E+00 | -1.009E-02 | 4.051E-01 |
| a1 | -4.080E-01 | -3.087E-02 | -3.319E-02 | -1.884E-03 |
| a2 | 4.833E-02 | -3.056E-02 | -2.309E-03 | 6.168E-03 |
| a3 | 1.420E-02 | 1.510E-02 | 5.915E-03 | 4.135E-03 |
| a4 | -3.480E-03 | 1.090E-02 | 2.298E-04 | -2.265E-04 |
| a5 | -1.227E-03 | 1.624E-03 | -7.859E-06 | 9.249E-05 |
| a6 | | | | 5.12E-05 |
| surface | 61 | 62 | 71 | 72 |
| NRADIUS | 1.377922797 | 1.618903879 | 1.854050941 | 1.887541395 |
| K | 2.803E-03 | -1.989E-01 | -4.652E-01 | 1.810E-01 |
| a0 | -4.268E-02 | -8.720E-02 | -9.157E-02 | 5.056E-02 |
| a1 | -8.854E-03 | -2.894E-02 | -8.269E-03 | 3.072E-02 |
| a2 | 8.506E-04 | 5.413E-03 | 8.449E-03 | 8.003E-03 |
| a3 | -1.534E-04 | -1.934E-03 | -2.904E-03 | 4.409E-04 |
| a4 | -1.873E-05 | 1.383E-04 | 2.803E-04 | -7.818E-04 |
| a5 | 1.040E-05 | 8.469E-05 | -4.576E-06 | -3.466E-04 |
| a6 | -1.343E-06 | -2.298E-05 | -4.873E-05 | -5.251E-05 |

FIG.9

| system focal length =1.292mm, half field-of-view =83.553°, F-number =2 | | | | | | |
|---|---|---|---|---|---|---|
| surface | | radius of curvature | thickness | refractive index | Abbe number | material | focal length |
| | object | ∞ | | | | | |
| 31 | first lens element 3 | 39.027 | 2.800 | 1.517 | 64.141 | Glass | -38.423 |
| 32 | | 12.842 | 12.173 | | | | |
| 41 | second lens element 4 | 19.147 | 1.841 | 1.545 | 56.114 | plastic | -6.767 |
| 42 | | 2.987 | 4.842 | | | | |
| 51 | third lens element 5 | -7.022 | 4.627 | 1.642 | 23.265 | plastic | 12.083 |
| 52 | | -4.635 | 1.577 | | | | |
| | aperture stop 2 | ∞ | -0.005 | | | | |
| 61 | fourth lens element 6 | 17.666 | 0.873 | 1.642 | 23.265 | plastic | -7.934 |
| 62 | | 3.877 | 0.176 | | | | |
| 71 | fifth lens element 7 | 3.973 | 1.626 | 1.545 | 56.114 | plastic | 3.236 |
| 72 | | -2.713 | 0.707 | | | | |
| 81 | optical filter 8 | ∞ | 0.400 | | | | |
| 82 | | ∞ | 3.372 | | | | |
| | image plane 9 | | | | | | |

FIG.12

| surface | 41 | 42 | 51 | 52 |
|---|---|---|---|---|
| NRADIUS | 5.284795361 | 3.360087581 | 3.282653705 | 3.604787459 |
| K | -2.270E-07 | 1.175E-03 | 8.623E-01 | -4.947E-02 |
| a0 | 2.024E+00 | 1.895E+00 | -7.629E-02 | 3.479E-01 |
| a1 | -2.395E-01 | 2.179E-01 | -4.197E-04 | -2.345E-02 |
| a2 | -1.233E-03 | 2.702E-03 | -4.998E-03 | 7.896E-03 |
| a3 | -1.396E-03 | -5.830E-04 | -1.984E-03 | -8.153E-04 |
| a4 | 2.385E-04 | -2.920E-03 | -3.088E-05 | -6.214E-04 |
| a5 | 2.206E-05 | -1.778E-03 | 1.360E-04 | -4.245E-04 |
| a6 | | | | 5.77E-05 |
| surface | 61 | 62 | 71 | 72 |
| NRADIUS | 1.348509636 | 1.726881306 | 2.084538011 | 2.24510808 |
| K | 1.558E-08 | -7.466E-03 | -9.459E-02 | -5.850E-03 |
| a0 | -3.425E-02 | -9.054E-02 | -7.462E-02 | 2.718E-01 |
| a1 | -3.684E-03 | -1.324E-02 | -2.571E-03 | 5.237E-02 |
| a2 | -1.027E-04 | 4.487E-04 | 3.497E-05 | 3.748E-03 |
| a3 | -2.327E-05 | 6.477E-04 | 3.312E-04 | -2.364E-03 |
| a4 | -2.980E-07 | 2.538E-04 | 2.075E-04 | 3.488E-04 |
| a5 | -1.368E-05 | -1.427E-05 | -2.865E-04 | 8.947E-04 |
| a6 | 3.778E-06 | -7.305E-05 | -1.664E-04 | 3.096E-04 |

FIG.13 system focal length = 1.518mm, half field-of-view = 84.843°, F-number = 2

| surface | | radius of curvature | thickness | refractive index | Abbe number | material | focal length |
|---|---|---|---|---|---|---|---|
| | object | ∞ | | | | | |
| 31 | first lens element 3 | 47.586 | 2.300 | 1.517 | 64.141 | Glass | -34.807 |
| 32 | | 12.842 | 12.450 | | | | |
| 41 | second lens element 4 | -22.156 | 1.340 | 1.545 | 56.114 | plastic | -6.014 |
| 42 | | 3.928 | 2.638 | | | | |
| 51 | third lens element 5 | -6.762 | 4.278 | 1.642 | 23.265 | plastic | 10.175 |
| 52 | | -4.144 | 3.096 | | | | |
| | aperture stop 2 | ∞ | 0.031 | | | | |
| 61 | fourth lens element 6 | 21.052 | 0.702 | 1.642 | 23.265 | plastic | -6.361 |
| 62 | | 3.375 | 0.114 | | | | |
| 71 | fifth lens element 7 | 3.697 | 1.107 | 1.545 | 56.114 | plastic | 2.998 |
| 72 | | -2.618 | 0.765 | | | | |
| 81 | optical filter 8 | ∞ | 0.400 | | | | |
| 82 | | ∞ | 3.608 | | | | |
| | image plane 9 | | | | | | |

FIG.16

| surface | 41 | 42 | 51 | 52 |
|---|---|---|---|---|
| NRADIUS | 6.432034067 | 3.489551539 | 3.23833743 | 3.755830216 |
| K | 1.081E-05 | 4.629E-01 | 1.673E+00 | -2.652E-01 |
| a0 | 2.137E+00 | 1.699E+00 | -1.587E-01 | 4.389E-01 |
| a1 | -1.810E-01 | 4.727E-01 | -3.788E-02 | -1.681E-02 |
| a2 | 6.244E-02 | -9.490E-03 | -1.867E-02 | 5.667E-03 |
| a3 | 2.365E-02 | -6.937E-02 | 3.664E-04 | 5.281E-05 |
| a4 | -2.608E-03 | -2.770E-02 | 4.616E-04 | 3.017E-04 |
| a5 | -8.423E-04 | -4.958E-03 | -2.321E-04 | 5.809E-04 |
| a6 |  |  |  | 1.67E-04 |
| surface | 61 | 62 | 71 | 72 |
| NRADIUS | 1.41169348 | 1.843166486 | 2.14363556 | 2.478171792 |
| K | 1.916E-06 | 1.862E-02 | -7.355E-01 | 2.086E-01 |
| a0 | -4.785E-02 | -9.646E-02 | -1.148E-01 | 2.205E-01 |
| a1 | -1.074E-02 | -3.479E-02 | 8.920E-04 | 9.062E-02 |
| a2 | -1.400E-04 | 9.536E-03 | 2.112E-02 | -1.251E-03 |
| a3 | -1.186E-04 | 2.689E-04 | 1.643E-03 | -9.142E-03 |
| a4 | -1.362E-05 | 8.700E-04 | -3.706E-04 | 3.538E-03 |
| a5 | -6.893E-06 | -2.245E-04 | -2.246E-03 | 4.395E-03 |
| a6 | -1.140E-05 | -1.457E-04 | -7.070E-04 | 1.073E-03 |

FIG.17 system focal length =1.270 mm, half field-of-view =81.304°, F-number =2

| surface | | radius of curvature | thickness | refractive index | Abbe number | material | focal length |
|---|---|---|---|---|---|---|---|
| | object | ∞ | | | | | |
| 31 | first lens element 3 | 39.286 | 3.501 | 1.517 | 64.141 | Glass | -28.272 |
| 32 | | 10.329 | 5.419 | | | | |
| 41 | second lens element 4 | 25.193 | 2.635 | 1.545 | 56.114 | plastic | -7.757 |
| 42 | | 3.486 | 5.936 | | | | |
| 51 | third lens element 5 | -8.059 | 7.458 | 1.642 | 23.265 | plastic | 12.028 |
| 52 | | -5.370 | 2.032 | | | | |
| | aperture stop 2 | ∞ | -0.014 | | | | |
| 61 | fourth lens element 6 | 17.791 | 1.078 | 1.642 | 23.265 | plastic | -7.165 |
| 62 | | 3.568 | 0.107 | | | | |
| 71 | fifth lens element 7 | 3.709 | 2.188 | 1.545 | 56.114 | plastic | 3.404 |
| 72 | | -2.940 | 0.765 | | | | |
| 81 | optical filter 8 | ∞ | 0.400 | | | | |
| 82 | | ∞ | 3.482 | | | | |
| | image plane 9 | | | | | | |

FIG.20

| surface | 41 | 42 | 51 | 52 |
|---|---|---|---|---|
| NRADIUS | 6.2515370836 | 3.80625097 | 3.694001628 | 3.87984621 |
| K | -1.331E-03 | -2.286E-01 | 4.648E-01 | -6.104E-02 |
| a0 | 2.286E+00 | 1.680E+00 | -5.144E-02 | 3.784E-01 |
| a1 | -2.332E-01 | 1.315E-01 | -1.915E-02 | -1.586E-02 |
| a2 | 2.335E-03 | -6.759E-03 | -4.811E-03 | 1.117E-02 |
| a3 | -1.134E-03 | 6.661E-03 | -3.098E-03 | 1.997E-04 |
| a4 | 2.138E-04 | 1.055E-03 | -9.077E-04 | 3.096E-04 |
| a5 | 2.018E-05 | -3.622E-04 | -3.591E-04 | -8.433E-05 |
| a6 | | | | 1.20E-04 |

| surface | 61 | 62 | 71 | 72 |
|---|---|---|---|---|
| NRADIUS | 1.491729108 | 1.866715901 | 2.201166107 | 2.413295161 |
| K | 4.292E-10 | 3.230E-03 | -1.407E-01 | -3.983E-02 |
| a0 | -3.283E-02 | -9.834E-02 | -8.325E-02 | 3.003E-01 |
| a1 | -3.446E-03 | -1.336E-02 | -3.486E-03 | 5.889E-02 |
| a2 | -4.286E-05 | 6.365E-04 | -6.858E-04 | 4.973E-03 |
| a3 | 3.670E-05 | 1.333E-03 | 3.936E-04 | -3.324E-03 |
| a4 | -4.620E-05 | 9.709E-04 | -3.669E-04 | 1.943E-05 |
| a5 | -3.373E-05 | 1.892E-04 | -1.295E-03 | 1.173E-03 |
| a6 | -2.966E-05 | -1.055E-04 | -6.065E-04 | 4.633E-04 |

FIG.21 system focal length =1.219mm, half field-of-view =83.164°, F-number =2

| surface | | radius of curvature | thickness | refractive index | Abbe number | material | focal length |
|---|---|---|---|---|---|---|---|
| | object | ∞ | | | | | |
| 31 | first lens element 3 | 45.598 | 2.058 | 1.517 | 64.141 | Glass | -26.415 |
| 32 | | 10.347 | 8.285 | | | | |
| 41 | second lens element 4 | 36.426 | 2.892 | 1.545 | 56.114 | plastic | -7.296 |
| 42 | | 3.484 | 5.483 | | | | |
| 51 | third lens element 5 | -7.517 | 5.128 | 1.642 | 23.265 | plastic | 13.316 |
| 52 | | -5.066 | 4.142 | | | | |
| | aperture stop 2 | ∞ | -0.016 | | | | |
| 61 | fourth lens element 6 | 15.358 | 0.370 | 1.642 | 23.265 | plastic | -6.799 |
| 62 | | 3.367 | 0.100 | | | | |
| 71 | fifth lens element 7 | 3.250 | 2.085 | 1.545 | 56.114 | plastic | 3.159 |
| 72 | | -2.831 | 0.721 | | | | |
| 81 | optical filter 8 | ∞ | 0.400 | | | | |
| 82 | | ∞ | 3.351 | | | | |
| | image plane 9 | ∞ | | | | | |

FIG.24

| surface | 41 | 42 | 51 | 52 |
|---|---|---|---|---|
| NRADIUS | 6.186980891 | 3.526597577 | 3.542707785 | 3.745712758 |
| K | -5.318E-07 | -4.370E-01 | 8.625E-02 | -2.621E-02 |
| a0 | 2.070E+00 | 1.388E+00 | -2.676E-02 | 3.374E-01 |
| a1 | -2.334E-01 | 7.299E-02 | -2.071E-02 | -4.268E-03 |
| a2 | 1.292E-03 | -2.922E-02 | -3.472E-03 | 3.554E-03 |
| a3 | -2.012E-03 | -8.325E-03 | -8.657E-05 | 2.341E-05 |
| a4 | 4.239E-04 | -1.942E-03 | -6.264E-05 | 7.168E-05 |
| a5 | 5.906E-05 | -9.931E-04 | 1.320E-04 | 2.854E-06 |
| a6 | | | | 1.65E-06 |
| surface | 61 | 62 | 71 | 72 |
| NRADIUS | 1.391670584 | 1.747084036 | 2.032909558 | 2.287248413 |
| K | -1.195E-11 | 5.999E-02 | -2.289E-01 | 2.369E-02 |
| a0 | -3.170E-02 | -9.010E-02 | -8.560E-02 | 2.621E-01 |
| a1 | -6.840E-03 | -2.125E-02 | 9.579E-04 | 6.576E-02 |
| a2 | 1.346E-04 | 3.587E-03 | 8.971E-04 | 4.562E-03 |
| a3 | -1.196E-04 | 1.290E-03 | -8.682E-04 | -5.949E-03 |
| a4 | 3.928E-05 | 9.396E-04 | -5.349E-04 | -1.405E-03 |
| a5 | 2.647E-05 | -3.673E-04 | -1.280E-03 | 8.040E-04 |
| a6 | -8.379E-06 | -2.421E-04 | -3.344E-04 | 4.369E-04 |

FIG.25

| system focal length =1.219mm, half field-of-view =83.164°, F-number =2 | | | | | | |
|---|---|---|---|---|---|---|
| surface | | radius of curvature | thickness | refractive index | Abbe number | material | focal length |
| | object | ∞ | | | | | |
| 31 | first lens element 3 | 22.650 | 1.573 | 1.774 | 49.624 | Glass | -9.389 |
| 32 | | 5.334 | 3.530 | | | | |
| 41 | second lens element 4 | -24.519 | 1.200 | 1.545 | 56.114 | plastic | -4.018 |
| 42 | | 2.445 | 2.124 | | | | |
| 51 | third lens element 5 | 10.742 | 3.569 | 1.642 | 23.265 | plastic | 5.561 |
| 52 | | -4.652 | 1.659 | | | | |
| | aperture stop 2 | ∞ | 0.159 | | | | |
| 61 | fourth lens element 6 | -6.574 | 0.765 | 1.642 | 23.265 | plastic | -8.322 |
| 62 | | 29.786 | 0.205 | | | | |
| 71 | fifth lens element 7 | 5.886 | 1.695 | 1.545 | 56.114 | plastic | 3.302 |
| 72 | | -2.328 | 0.600 | | | | |
| 81 | optical filter 8 | ∞ | 0.400 | | | | |
| 82 | | ∞ | 3.136 | | | | |
| | image plane 9 | ∞ | | | | | |

FIG.28

| surface | 41 | 42 | 51 | 52 |
|---|---|---|---|---|
| NRADIUS | 4.226060589 | 2.749432445 | 2.75869063 | 2.5837383 |
| K | 0.000E+00 | -1.000E+00 | 0.000E+00 | 0.000E+00 |
| a0 | 4.932E-01 | 1.994E-01 | -1.878E-01 | 9.226E-02 |
| a1 | -6.951E-02 | 7.073E-02 | 3.550E-02 | -3.462E-03 |
| a2 | 3.082E-04 | 5.092E-04 | -2.318E-04 | -6.947E-04 |
| a3 | 0.000E+00 | 1.024E-03 | -3.826E-06 | -1.265E-05 |
| a4 | 0.000E+00 | -1.930E-04 | 0.000E+00 | -2.901E-10 |
| a5 | 0.000E+00 | 6.517E-05 | 0.000E+00 | 2.982E-10 |
| a6 | | -1.59E-07 | 0.00E+00 | 0.00E+00 |
| a7 | | 1.55E-05 | 0.00E+00 | 0.00E+00 |

| surface | 61 | 62 | 71 | 72 |
|---|---|---|---|---|
| NRADIUS | 1.052771215 | 1.380529537 | 1.731030191 | 1.92241829 |
| K | 0.000E+00 | 0.000E+00 | 0.000E+00 | 0.000E+00 |
| a0 | 1.319E-02 | 7.429E-02 | 1.078E-02 | 1.730E-01 |
| a1 | -1.469E-03 | -6.108E-03 | -1.233E-03 | 2.388E-02 |
| a2 | -6.025E-05 | -7.907E-04 | -1.231E-03 | 4.393E-03 |
| a3 | 9.474E-07 | 6.228E-06 | 1.316E-05 | 3.416E-05 |
| a4 | 1.192E-11 | 0.000E+00 | 2.012E-09 | -6.584E-07 |
| a5 | 0.000E+00 | 0.000E+00 | 0.000E+00 | 3.157E-07 |
| a6 | 0.000E+00 | 0.000E+00 | 0.000E+00 | -2.129E-07 |
| a7 | 0.000E+00 | 0.000E+00 | 0.000E+00 | 3.344E-07 |
| a8 | 0.000E+00 | 0.000E+00 | 0.000E+00 | -1.46E-07 |

FIG.29

| Preferred embodiment relationship | first | second | third | fourth | fifth | sixth | seventh |
|---|---|---|---|---|---|---|---|
| EFL/CT1 | 0.183 | 2.000 | 0.461 | 0.660 | 0.363 | 0.592 | 0.854 |
| (AC12+AC45)/AC34 | 1.215 | 0.800 | 7.857 | 4.017 | 2.739 | 2.032 | 2.054 |
| EFL/AC23 | 0.225 | 0.338 | 0.267 | 0.575 | 0.214 | 0.222 | 0.632 |
| BFL/AC34 | 1.220 | 0.987 | 2.850 | 1.526 | 2.304 | 1.084 | 2.275 |
| (CT1+AC23)/CT5 | 7.960 | 4.290 | 4.700 | 4.463 | 4.314 | 3.617 | 2.182 |
| CT3/CT1 | 0.760 | 2.500 | 1.652 | 1.860 | 2.130 | 2.491 | 2.269 |
| CT2/AC34 | 0.614 | 0.262 | 1.172 | 0.428 | 1.306 | 0.701 | 0.660 |
| (CT1+AC23)/EFL | 9.905 | 3.462 | 5.917 | 3.254 | 7.428 | 6.189 | 2.753 |
| BFL/AC23 | 0.759 | 1.158 | 0.925 | 1.809 | 0.783 | 0.815 | 1.947 |
| (AC12+AC45)/AC23 | 0.756 | 0.939 | 2.550 | 4.763 | 0.931 | 1.529 | 1.758 |
| CT3/AC34 | 1.503 | 0.360 | 2.944 | 1.368 | 3.697 | 1.243 | 1.963 |
| CT5/CT1 | 0.228 | 1.614 | 0.581 | 0.481 | 0.625 | 1.013 | 1.078 |
| CT3/AC23 | 0.935 | 0.422 | 0.955 | 1.622 | 1.257 | 0.935 | 1.680 |
| EFL/AC34 | 0.362 | 0.288 | 0.822 | 0.485 | 0.630 | 0.295 | 0.739 |
| (CT1+AC23)/CT2 | 5.835 | 3.799 | 4.150 | 3.685 | 3.582 | 2.608 | 3.081 |

FIG.31

IMAGING LENS, AND ELECTRONIC APPARATUS INCLUDING THE SAME

CROSS-REFERENCE TO RELATED APPLICATION

This application claims priority to Taiwanese Application No. 102146945, filed on Dec. 18, 2013.

BACKGROUND OF THE INVENTION

1. Field of the Invention

The present invention relates to an imaging lens and an electronic apparatus including the same.

2. Description of the Related Art

In recent years, for the purposes of driving safety and environmental monitoring, it is required to have a camera module including an imaging lens capable of providing a relatively large field of view.

As techniques related to charged coupled device (COD) and complementary metal-oxide semiconductor (CMOS) based optical sensors progress, dimensions of imaging lenses for use in a camera module must be correspondingly reduced without significantly compromising optical performance.

Each of U.S. patent application publication Nos. 20130057968, and 20120307382 and U.S. Pat. No. 7,911,711 discloses a conventional imaging lens that has a relatively small field of view, which do not satisfy market requirements.

Therefore, increasing the field of view of the imaging lens while maintaining satisfactory optical performance is a goal in the industry.

SUMMARY OF THE INVENTION

Therefore, an object of the present invention is to provide an imaging lens having a wider field of view while maintaining good optical performance.

According to one aspect of the present invention, an imaging lens comprises a first lens element, a second lens element, a third lens element, a fourth lens element and a fifth lens element arranged in order from an object side to an image side along an optical axis of the imaging lens. Each of the first lens element, the second lens element, the third lens element, the fourth lens element and the fifth lens element has an object-side surface facing toward the object side and an image-side surface facing toward the image side.

The object-side surface of the first lens element has a convex portion in a vicinity of the optical axis. The object-side surface of the second lens element has a convex portion in a vicinity of a periphery of the second lens element, and the image-side surface of the second lens element has a concave portion in a vicinity of the periphery of the second lens element. The image-side surface of the third lens element has a convex portion in a vicinity of the optical axis. The image-side surface of the fourth lens element has a concave portion in a vicinity of a periphery of the fourth lens element. The fifth lens element has a positive refractive power and is made of a plastic material. The object-side surface of the fifth lens element has a convex portion in a vicinity of a periphery of the fifth lens element. The imaging lens does not include any lens element with refractive power other than the first lens element, the second lens element, the third lens element, the fourth lens element and the fifth lens element.

Another object of the present invention is to provide an electronic apparatus having an imaging lens with five lens elements.

According to another aspect of the present invention, an electronic apparatus includes a housing and an imaging module. The imaging module is disposed in the housing, and includes the imaging lens of the present invention, a barrel on which the imaging lens is disposed, a holder unit on which the barrel is disposed, and an image sensor disposed at the image side of the imaging lens.

BRIEF DESCRIPTION OF THE DRAWINGS

Other features and advantages of the present invention will become apparent in the following detailed description of the preferred embodiments with reference to the accompanying drawings, of which:

FIG. 3 shows values of some optical parameters corresponding to the imaging lens of the first preferred embodiment;

FIG. 4 shows values of some parameters of an optical relationship corresponding to the imaging lens of the first preferred embodiment;

FIG. 8 shows values of some optical parameters corresponding to the imaging lens of the second preferred embodiment;

FIG. 9 shows values of some parameters of an optical relationship corresponding to the imaging lens of the second preferred embodiment;

FIG. 12 shows values of some optical parameters corresponding to the imaging lens of the third preferred embodiment;

FIG. 13 shows values of some parameters of an optical relationship corresponding to the imaging lens of the third preferred embodiment;

FIG. 16 shows values of some optical parameters corresponding to the imaging lens of the fourth preferred embodiment;

FIG. 17 shows values of some parameters of an optical relationship corresponding to the imaging lens of the fourth preferred embodiment;

FIG. 20 shows values of some optical parameters corresponding to the imaging lens of the fifth preferred embodiment;

FIG. 21 shows values of some parameters of an optical relationship corresponding to the imaging lens of the fifth preferred embodiment;

FIG. 24 shows values of some optical parameters corresponding to the imaging lens of the sixth preferred embodiment;

FIG. 25 shows values of some parameters of an optical relationship corresponding to the imaging lens of the sixth preferred embodiment;

FIG. 28 shows values of some optical parameters corresponding to the imaging lens of the seventh preferred embodiment;

FIG. 29 shows values of some parameters of an optical relationship corresponding to the imaging lens of the seventh preferred embodiment;

FIG. 31 is a table that list values of parameters of other optical relationships corresponding to the imaging lenses of the first to seventh preferred embodiments.

DETAILED DESCRIPTION OF THE PREFERRED EMBODIMENTS

Figure 1:
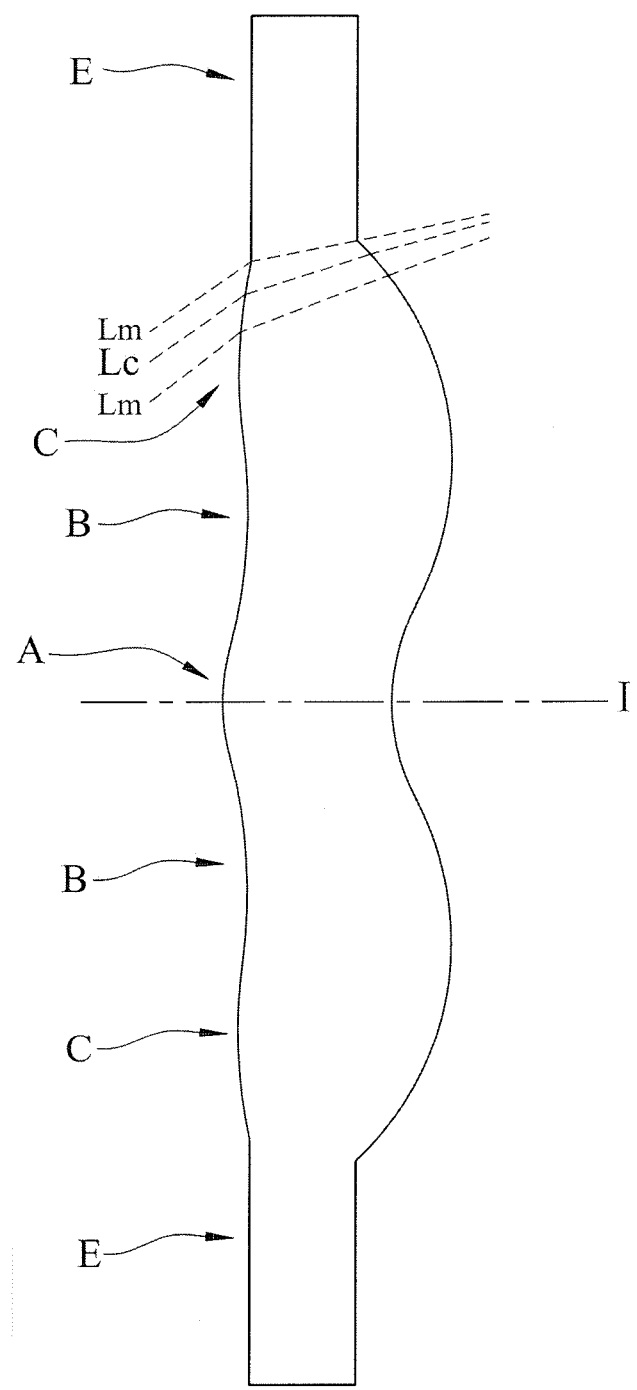
FIG. 1 is a schematic diagram to illustrate the structure of a lens element.

Before the present invention is described in greater detail, it should be noted that like elements are denoted by the same reference numerals throughout the disclosure.

In the following description, "a lens element has a positive (or negative) refractive power" means the lens element has a positive (or negative) refractive power in a vicinity of an optical axis thereof. "An object-side surface (or image-side surface) has a convex (or concave) portion at a certain area" means that, compared to a radially exterior area adjacent to said certain area, said certain area is more convex (or concave) in a direction parallel to the optical axis. Referring to FIG. 1 as an example, the lens element is radially symmetrical with respect to an optical axis (I) thereof. The object-side surface of the lens element has a convex portion at an area A, a concave portion at an area B, and a convex portion at an area C. This is because the area A is more convex in a direction parallel to the optical axis (I) in comparison with a radially exterior area thereof (i.e., area B), the area B is more concave in comparison with the area C, and the area C is more convex in comparison with an area E. "In a vicinity of a periphery" refers to an area around a periphery of a curved surface of the lens element for passage of imaging light only, which is the area C in FIG. 1. The imaging light includes a chief ray Lc and a marginal ray Lm. "In a vicinity of the optical axis" refers to an area around the optical axis of the curved surface for passage of the imaging light only, which is the area A in FIG. 1. In addition, the lens element further includes an extending portion E for installation into an optical imaging lens device. Ideally, the imaging light does not pass through the extending portion E. The structure and shape of the extending portion E are not limited herein. In the following embodiments, the extending portion E is not depicted in the drawings for the sake of clarity.

Figure 2:
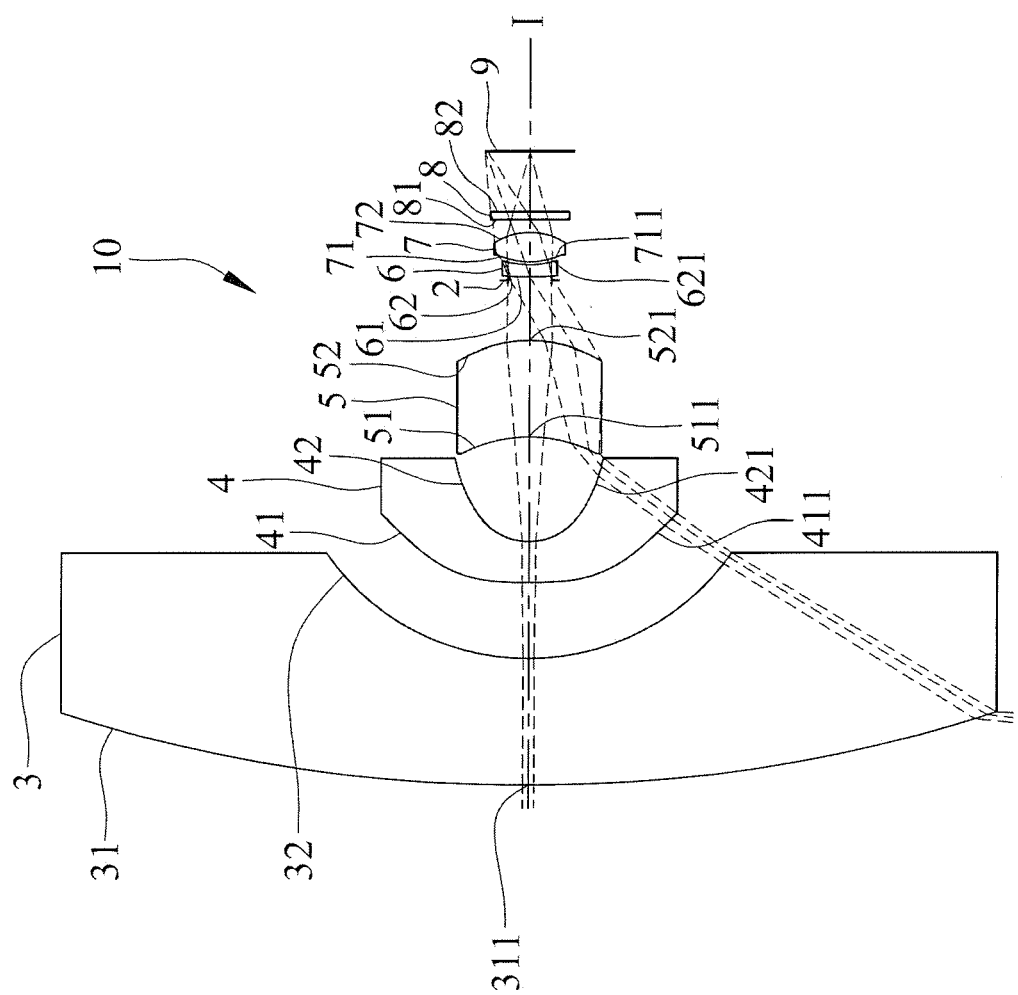
FIG. 2 is a schematic diagram that illustrates a first preferred embodiment of an imaging lens according to the present invention.

Referring to FIG. 2, the first preferred embodiment of an imaging lens 10 according to the present invention includes a first lens element 3, a second lens element 4, a third lens element 5, an aperture stop 2, a fourth lens element 6, a fifth lens element 7, and an optical filter 8 arranged in the given order along an optical axis (I) from an object side to an image side. The optical filter 8 is an infrared cut filter for selectively absorbing infrared light to thereby reduce imperfection of images formed at an image plane 9.

Each of the first, second, third, fourth and fifth lens elements 3 to 7 and the optical filter 8 has an object-side surface 31, 41, 51, 61, 71, 81 facing toward the object side, and an image-side surface 32, 42, 52, 62, 72, 82 facing toward the image side. Light entering the imaging lens 10 travels through the object-side and image-side surfaces 31, 32 of the first lens element 3, the object-side and image-side surfaces 41, 42 of the second lens element 4, the object-side and image-side surfaces 51, 52 of the third lens element 5, the aperture stop 2, the object-side and image-side surfaces 61, 62 of the fourth lens element 6, the object-side and image-side surfaces 71, 72 of the fifth lens element 7, and the object-side and image-side surfaces 81, 82 of the optical filter 8, in the given order, to form an image on the image plane 9. Except for the object-side surface 31 and the image-side surface 32, each of the object-side surfaces 41, 51, 61, 71 and the image-side surfaces 42, 52, 62, 72 is aspherical and has a center point coinciding with the optical axis (I).

The first lens element 3 is a spherical lens element Made of a glass material, and each of the remaining lens elements 4-7 is an aspherical lens element made of a plastic material in this embodiment.

In the first preferred embodiment, which is depicted in FIG. 2, the first lens element 3 has a negative refractive power. The object-side surface 31 of the first lens element 3 is a convex surface that has a convex portion 311 in a vicinity of the optical axis (I), and the image-side surface 32 of the first lens element 3 is a concave surface.

The second lens element 4 has a negative refractive power. The object-side surface 41 of the second lens element 4 is a convex surface that has a convex portion 411 in a vicinity of a periphery of the second lens element 4, and the image-side surface 42 of the second lens element 4 is a concave surface that has a concave portion 421 in a vicinity of the periphery of the second lens element 4.

The third lens element 5 has a positive refractive power. The object-side surface 51 of the third lens element 5 is a concave surface that has a concave portion 511 in a vicinity of the optical axis (I), and the image-side surface 52 of the third lens element 5 is a convex surface that has a convex portion 521 in a vicinity of the optical axis (I).

The fourth lens element 6 has a negative refractive power. The object-side surface 61 of the fourth lens element 6 is a convex surface, and the image-side surface 62 of the fourth lens element 6 is a concave surface that has a concave portion 621 in a vicinity of a periphery of the fourth lens element 6.

The fifth lens element 7 has a positive refractive power. The object-side surface 71 of the fifth lens element 7 is a convex surface that has a convex portion 711 in a vicinity of a periphery of the fifth lens element 7, and the image-side surface 72 of the fifth lens element 7 is a convex surface.

In the first preferred embodiment, the imaging lens 10 does not include any lens element with refractive power other than the aforesaid lens elements 3-7.

Shown in FIG. 3 is a table that lists values of some optical parameters corresponding to the surfaces 31-81, 32-82 of the first preferred embodiment. The imaging lens 10 has an overall system effective focal length (EFL) of 1.297 mm, a half field-of-view (HFOV) of 82.695°, an F-number (Fno) of 2, and a system length (TTL) of 35.002 mm. The system length refers to a distance between the object-side surface 31 of the first lens element 3 and the image plane 9 at the optical axis (I).

Figure 6:
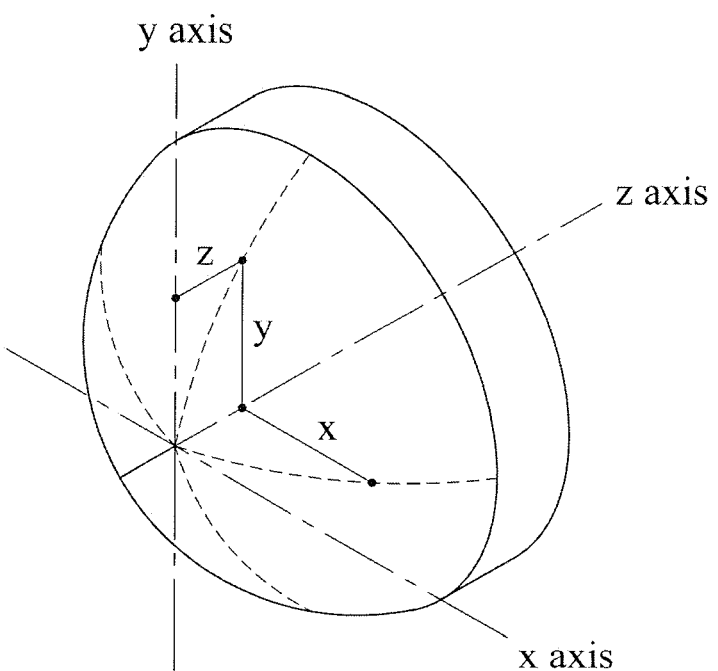
FIG. 6 is a schematic diagram that illustrates reference axes of an aspherical surface.

In this embodiment, each of the object-side surfaces 41-71 and the image-side surfaces 42-72 is aspherical, and satisfies the relationship of $$z = \frac{cr^2}{1 + \sqrt{1-(1+K)c^2r^2}} + u^4 \sum_{m=0}^{13} a_m Q_m^{con}(u^2) \quad (1)$$

where:
z represents a depth of an aspherical surface, which is defined as a perpendicular distance between an arbitrary point on the aspherical surface that is spaced apart from the optical axis (I) by a distance y, and a tangent plane at a vertex of the aspherical surface at the optical axis (I);
c represents a vertex curvature of the aspherical surface;
K represents a conic constant;
$r=\sqrt{x^2+y^2}$, and represents a radial distance;
$r_n$ represents a normalization radius (NRADIUS);
u represents $r/r_n$;
$a_m$ represents a $m^{th}$ $Q^{con}$ coefficient;
$Q_m^{con}$ represents a $m^{th}$ $Q^{con}$ polynomial; and
relationships among x, y, z are shown in FIG. 6, in which an axis (z) is the optical axis (I).

Shown in FIG. 4 is a table that lists values of some aspherical parameters of the aforementioned relationship (1) for the second lens element 4 to the fifth lens element 7 corresponding to the first preferred embodiment.

Relationships among some lens parameters corresponding to the first preferred embodiment are listed in FIG. 31, where:
CT1 represents a thickness of the first lens element 3 at the optical axis (I);
CT2 represents a thickness of the second lens element 4 at the optical axis (I);
CT3 represents a thickness of the third lens element 5 at the optical axis (I);
CT5 represents a thickness of the fifth lens element 7 at the optical axis (I);
AC12 represents an air gap length between the first lens element 3 and the second lens element 4 at the optical axis (I);
AC23 represents an air gap length between the second lens element 4 and the third lens element 5 at the optical axis (I);
AC34 represents an air gap length between the third lens element 5 and the fourth lens element 6 at the optical axis (I);
AC45 represents an air gap length between the fourth lens element 6 and the fifth lens element 7 at the optical axis (I)
EFL represents a system focal length of the imaging lens 10; and BFL represents a distance at the optical axis (I) between the image-side surface 72 of the fifth lens element 7 and the image plane 9 at the image side.

FIGS. 5(a) to 5(d) respectively show simulation results corresponding to longitudinal spherical aberration, sagittal astigmatism aberration, tangential astigmatism aberration, and distortion aberration of the first preferred embodiment. In each of the simulation results, curves corresponding respectively to wavelengths of 470 nm, 555 nm, and 650 nm are shown.

Figure 5:
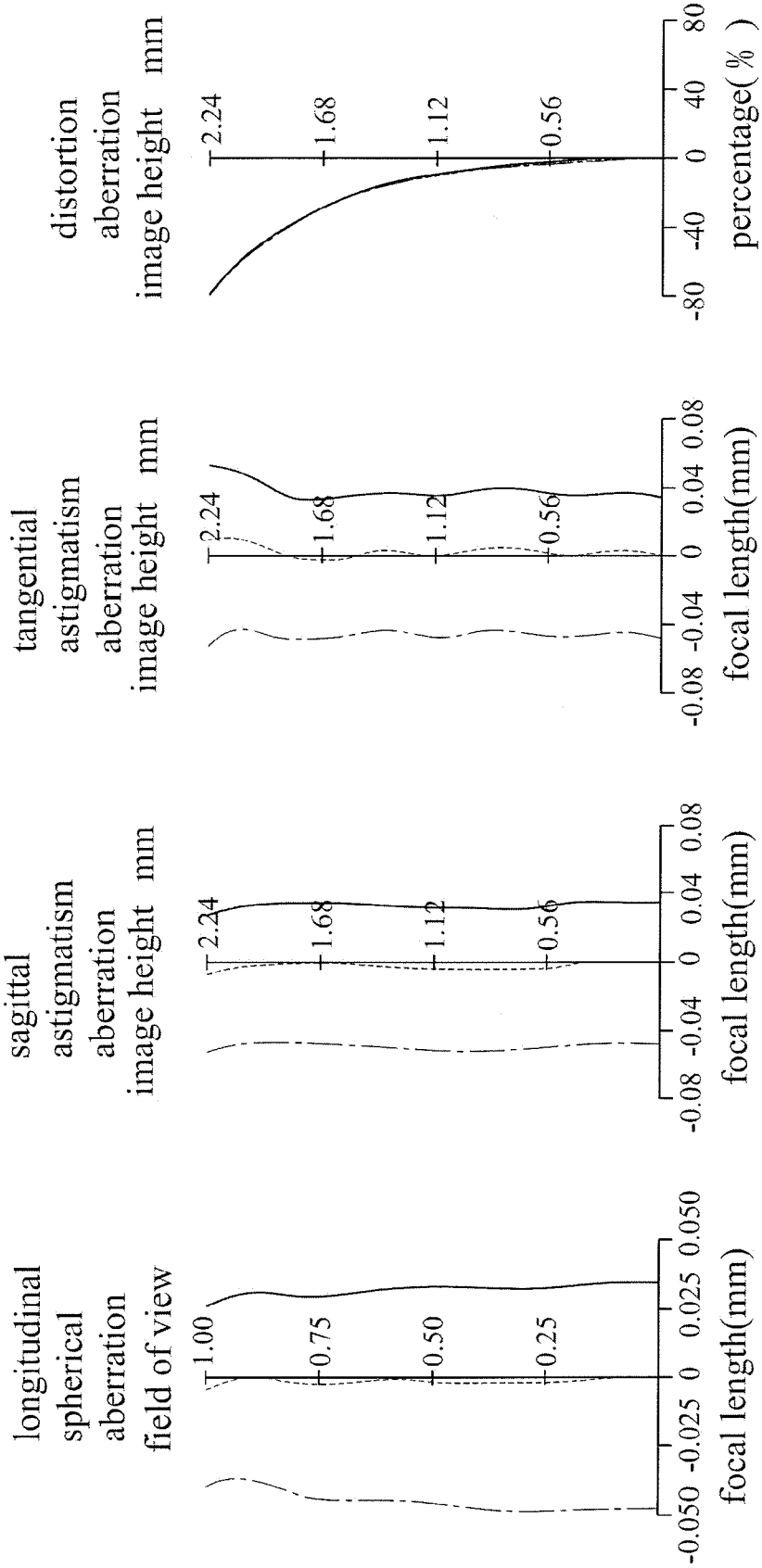
FIGS. 5(a) to 5(d) show different optical characteristics of the imaging lens of the first preferred embodiment.

It can be understood from FIG. 5(a) that, since each of the curves corresponding to longitudinal spherical aberration has a focal length at each field of view (indicated by the vertical axis) that falls within the range of ±0.01 mm, the first preferred embodiment is able to achieve a relatively low spherical aberration at each of the wavelengths. Furthermore, since a deviation in focal length among the curves at each field of view does not exceed the range of ±0.05 mm, the first preferred embodiment has a relatively low chromatic aberration.

It can be understood from FIGS. 5(b) and 5(c) that, since each of the curves falls within the range of ±0.1 mm of focal length, the first preferred embodiment has a relatively low optical aberration.

Moreover, FIG. 5(d) shows distortion aberration of the first preferred embodiment, and illustrates that the first preferred embodiment is able to meet requirements in imaging quality of most optical systems.

In view of the above, even with the wide HFOV of 82.695°, the imaging lens 10 of the first preferred embodiment is still able to achieve a relatively good optical performance.

Figure 7:
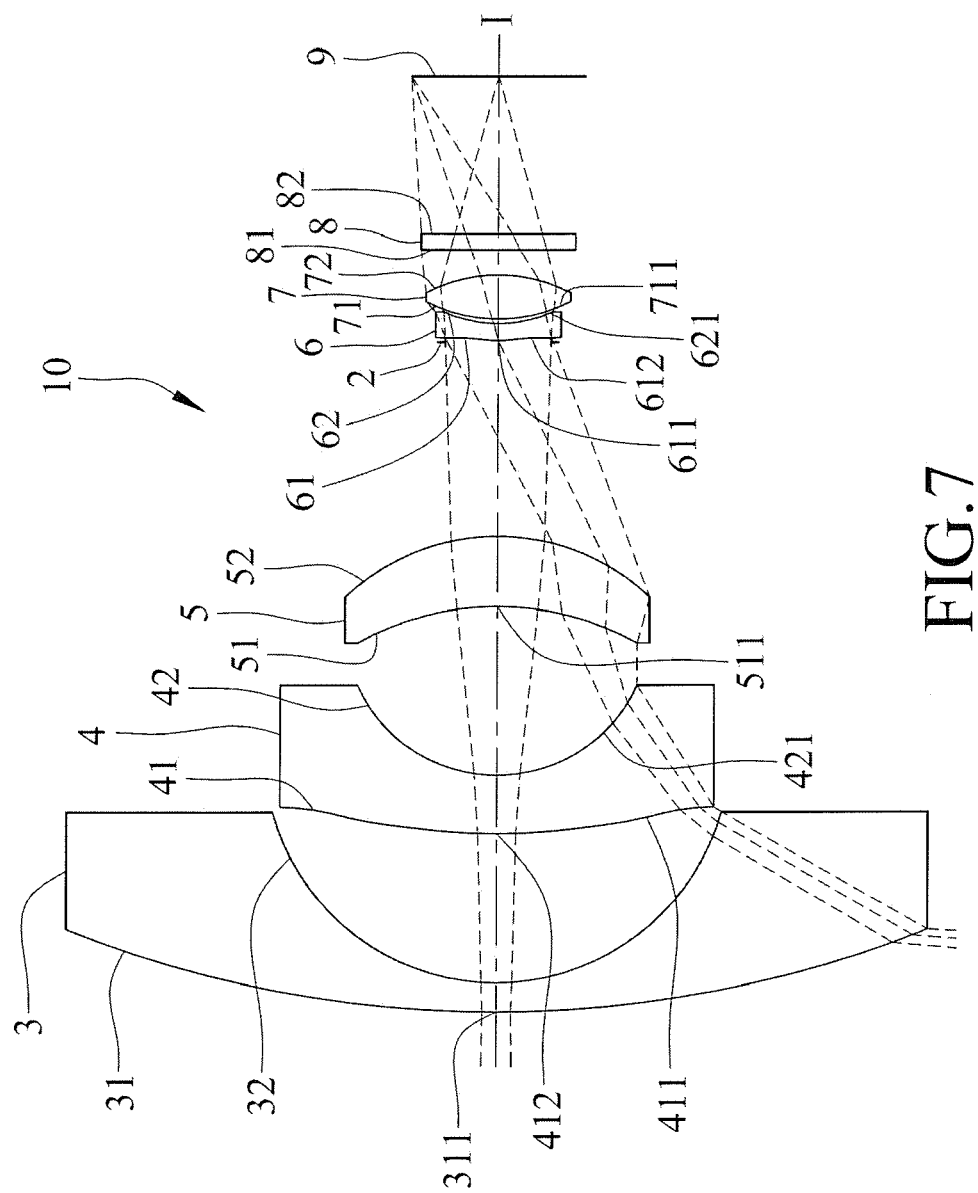
FIG. 7 is a schematic diagram that illustrates a second preferred embodiment of an imaging lens according to the present invention.
Figure 10:
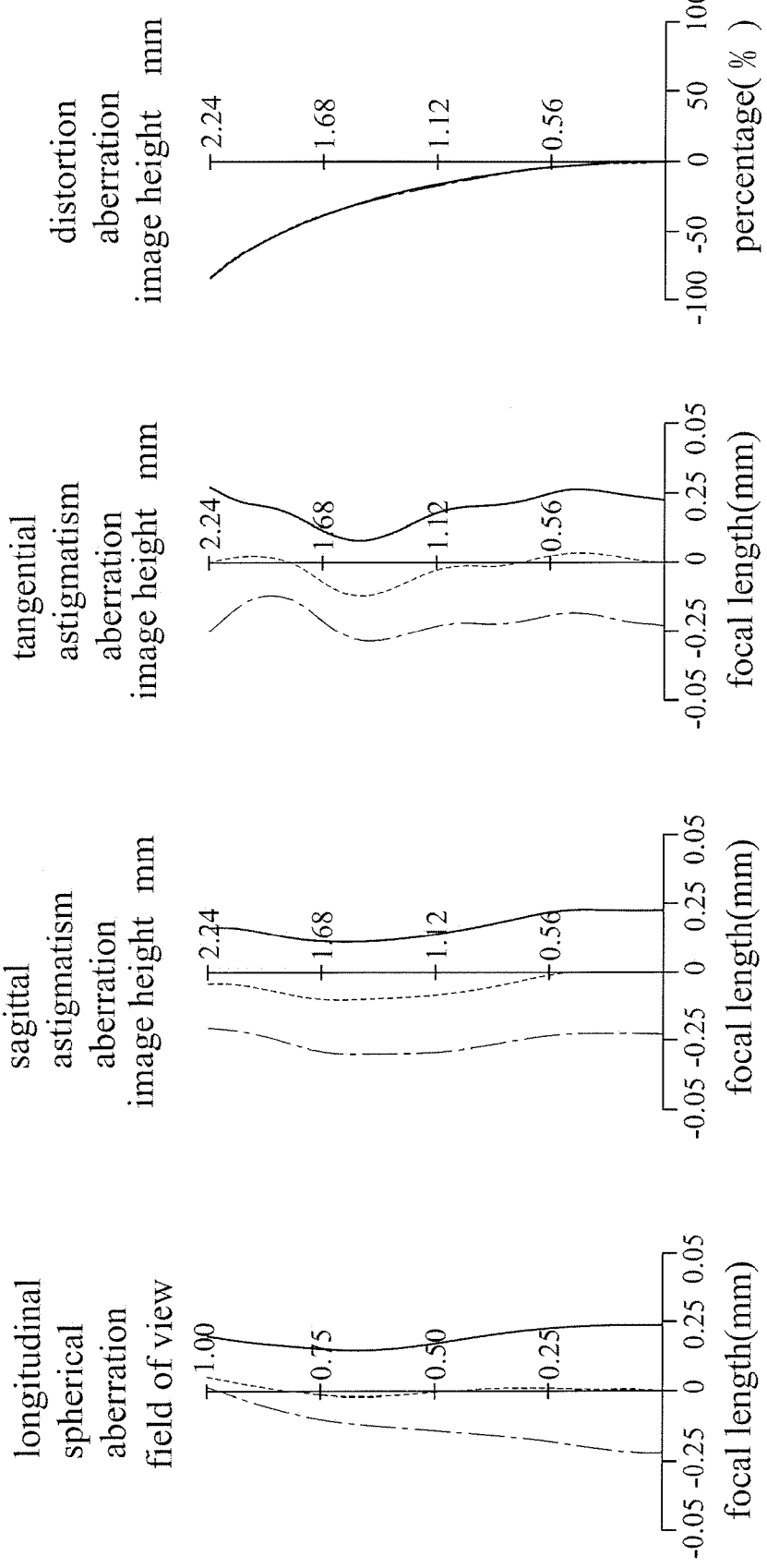
FIGS. 10(a) to 10(d) show different optical characteristics of the imaging lens of the second preferred embodiment.

Referring to FIG. 7, the differences between the first and second preferred embodiments of the imaging lens 10 of this invention reside in that: the object-side surface 41 of the second lens element 4 has a concave portion 412 in a vicinity of the optical axis (I), and a convex portion 411 in a vicinity of a periphery of the second lens element 4. The object-side surface 61 of the fourth lens element 6 has a convex portion 611 in a vicinity of the optical axis (I), and a concave portion 612 in a vicinity of a periphery of the fourth lens element 6.

Shown in FIG. 8 is a table that lists values of some optical parameters corresponding to the surfaces 31-81, 32-82 of the second preferred embodiment. The imaging lens 10 has an overall system focal length of 1.600 mm, an HFOV of 83.712°, an F-number of 2, and a system length of 26.192 mm.

Shown in FIG. 9 is a table that lists values of some aspherical parameters corresponding to the surfaces 41-71, 42-72 of the aforementioned relationship (1) corresponding to the second preferred embodiment.

Relationships among some of the aforementioned lens parameters corresponding to the second preferred embodiment are listed in FIG. 31.

FIGS. 10(a) to 10(d) respectively show simulation results corresponding to longitudinal spherical aberration, sagittal astigmatism aberration, tangential astigmatism aberration, and distortion aberration of the second preferred embodiment. It can be understood from FIGS. 10(a) to 10(d) that the second preferred embodiment is able to achieve a relatively good optical performance.

Figure 11:
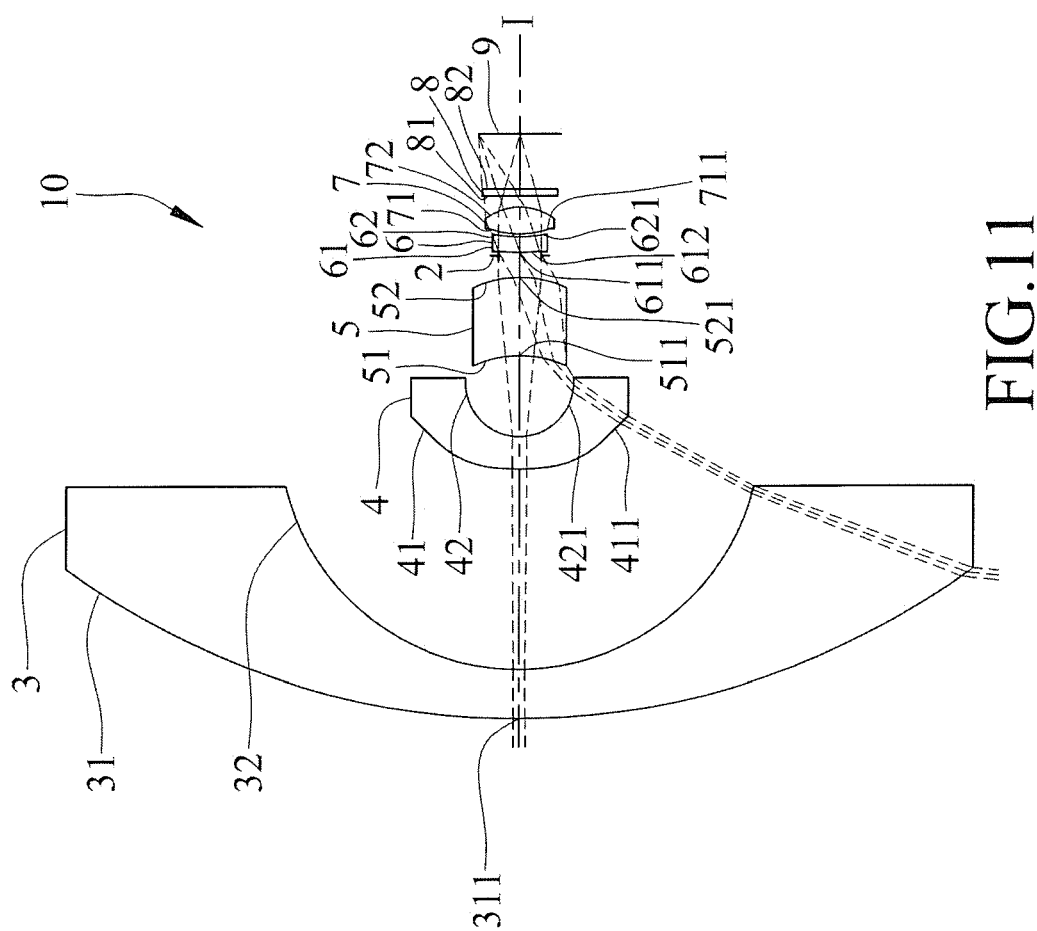
FIG. 11 is a schematic diagram that illustrates a third preferred embodiment of an imaging lens according to the present invention.
Figure 14:
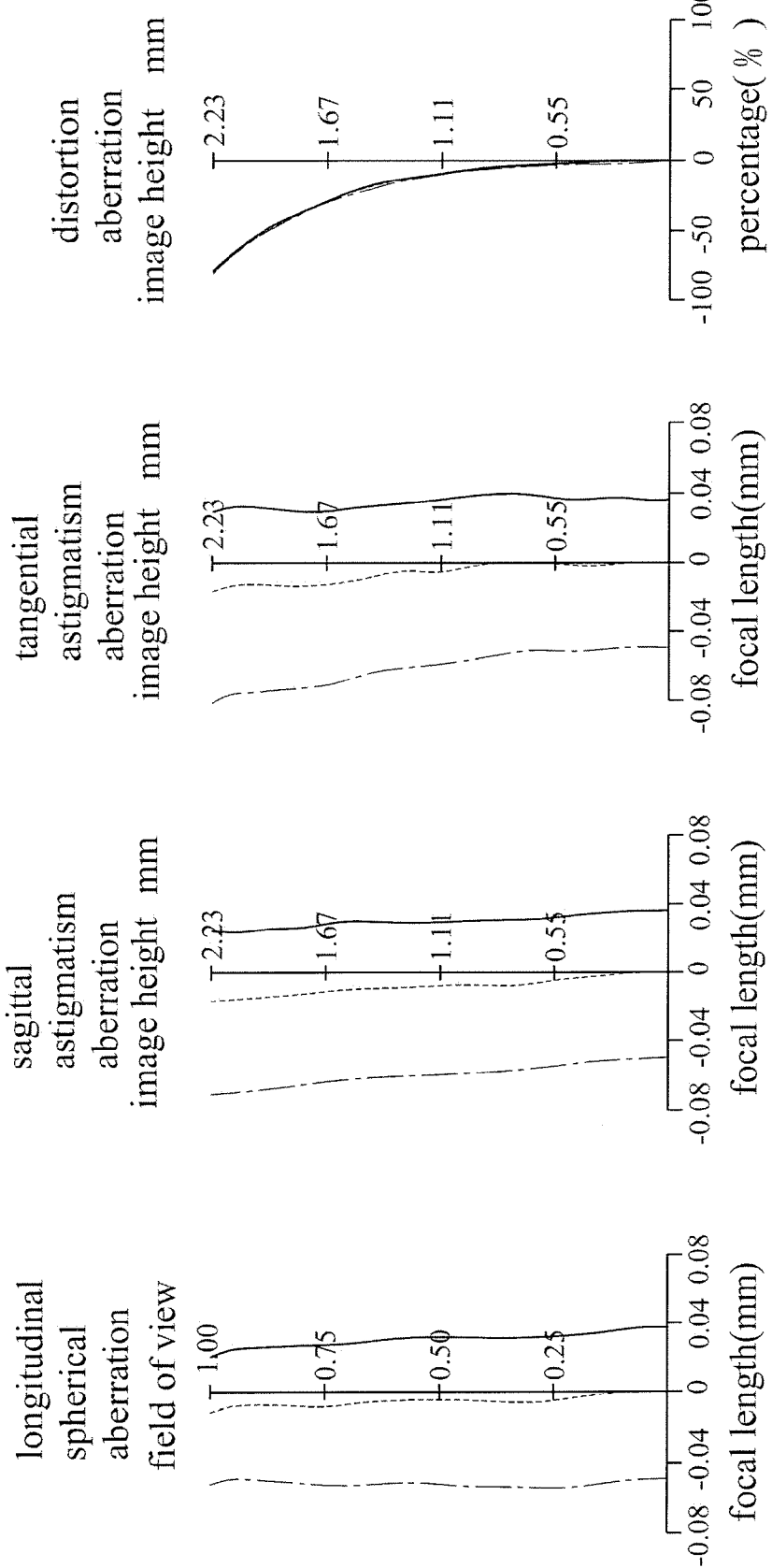
FIGS. 14(a) to 14(d) show different optical characteristics of the imaging lens of the third preferred embodiment.

Referring to FIG. 11, the differences between the first and third preferred embodiments of the imaging lens 10 of this invention reside in that: the object-side surface 61 of the fourth lens element 6 has a convex portion 611 in a vicinity of the optical axis (I), and a concave portion 612 in a vicinity of a periphery of the fourth lens element 6.

Shown in FIG. 12 is a table that lists values of some optical parameters corresponding to the surfaces 31-81, 32-82 of the third preferred embodiment. The imaging lens 10 has an overall system focal length of 1.292 mm, an HFOV of 83.553°, an F-number of 2, and a system length of 35.008 mm.

Shown in FIG. 13 is a table that lists values of some aspherical parameters corresponding to the surfaces 41-71, 42-72 of the aforementioned relationship (1) corresponding to the third preferred embodiment.

Relationships among some of the aforementioned lens parameters corresponding to the third preferred embodiment are listed in FIG. 31.

FIGS. 14(a) to 14(d) respectively show simulation results corresponding to longitudinal spherical aberration, sagittal astigmatism aberration, tangential astigmatism aberration, and distortion aberration of the third preferred embodiment. It can be understood from FIGS. 14(a) to 14(d) that the third preferred embodiment is able to achieve a relatively good optical performance.

Figure 15:
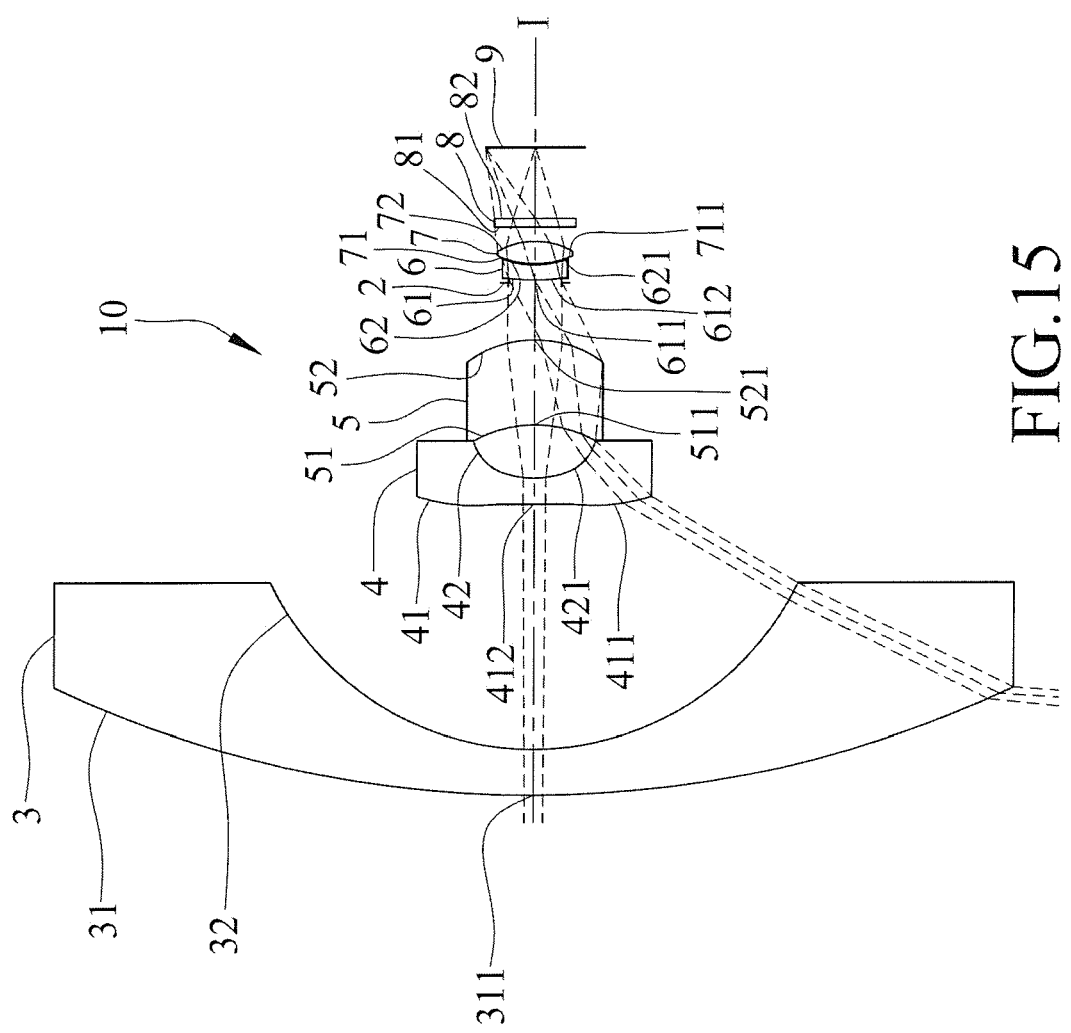
FIG. 15 is a schematic diagram that illustrates a fourth preferred embodiment of an imaging lens according to the present invention.
Figure 18:
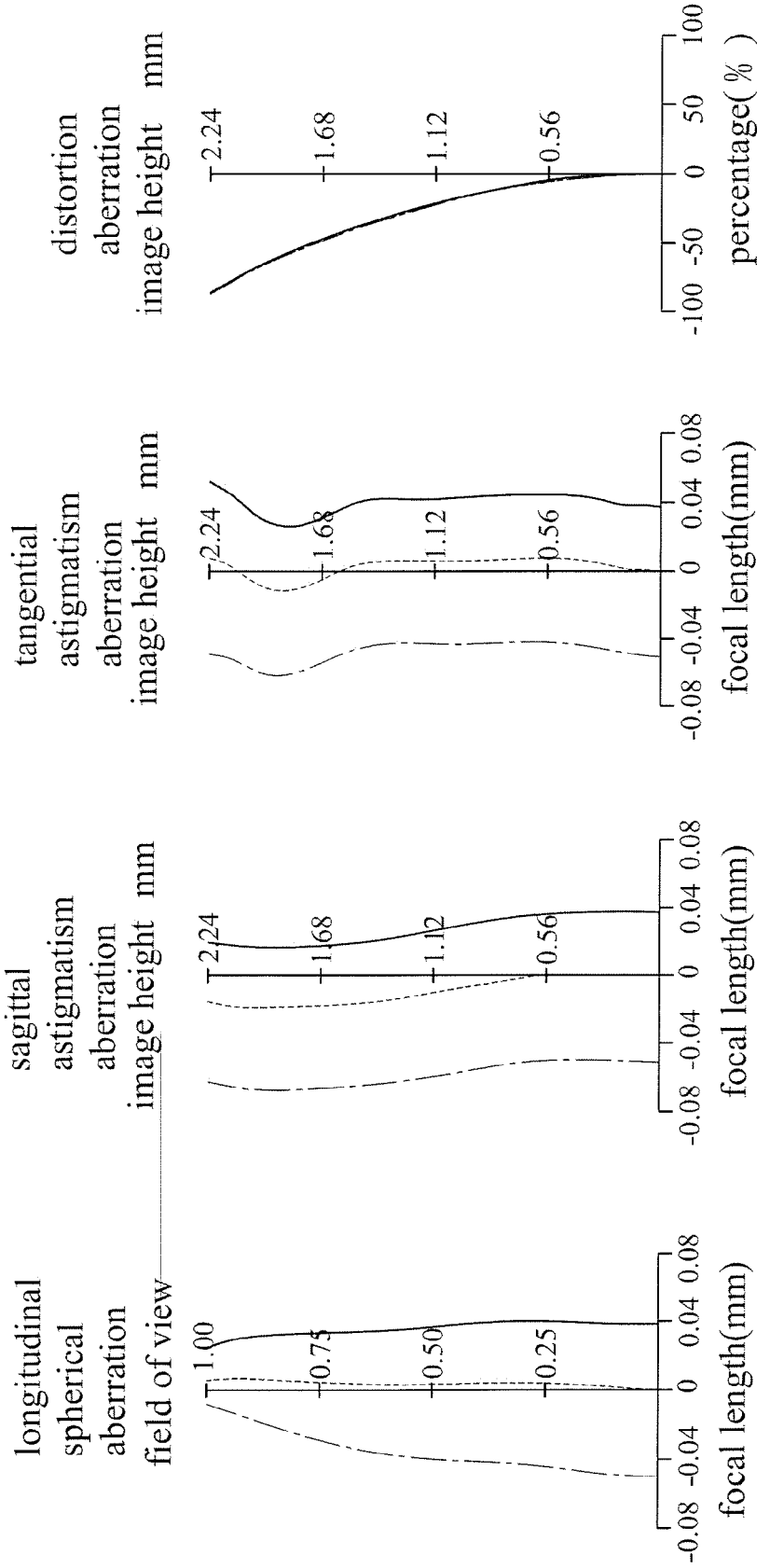
FIGS. 18(a) to 18(d) show different optical characteristics of the imaging lens of the fourth preferred embodiment.

Referring to FIG. 15, the fourth preferred embodiment of the imaging lens 10 of this invention is shown to have a configuration similar to that of the second preferred embodiment.

Shown in FIG. 16 is a table that lists values of some optical parameters corresponding to the surfaces 31-81, 32-82 of the fourth preferred embodiment. The imaging lens 10 has an overall system focal length of 1.518 mm, an HFOV of 84.843°, an F-number of 2, and a system length of 32.830 mm.

Shown in FIG. 17 is a table that lists values of some aspherical parameters corresponding to the surfaces 41-71, 42-72 of the aforementioned optical relationship (1) corresponding to the fourth preferred embodiment.

Relationships among some of the aforementioned optical parameters corresponding to the fourth preferred embodiment are listed in FIG. 31.

FIGS. 18(a) to 18(d) respectively show simulation results corresponding to longitudinal spherical aberration, sagittal astigmatism aberration, tangential astigmatism aberration, and distortion aberration of the fourth preferred embodiment. It can be understood from FIGS. 18(a) to 18(d) that the fourth preferred embodiment is able to achieve a relatively good optical performance.

Figure 19:
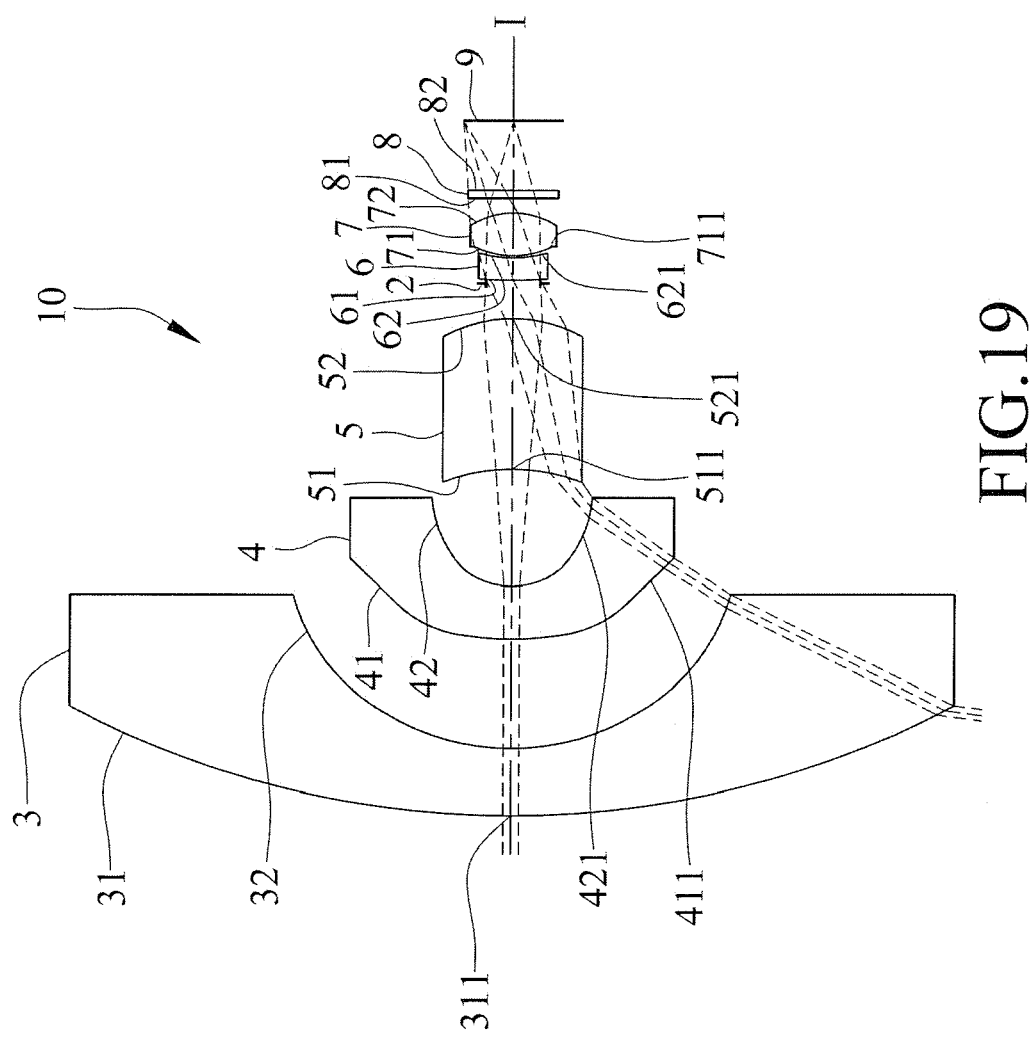
FIG. 19 is a schematic diagram that illustrates a fifth preferred embodiment of an imaging lens according to the present invention.
Figures 22A, 22B, 22C, 22D:
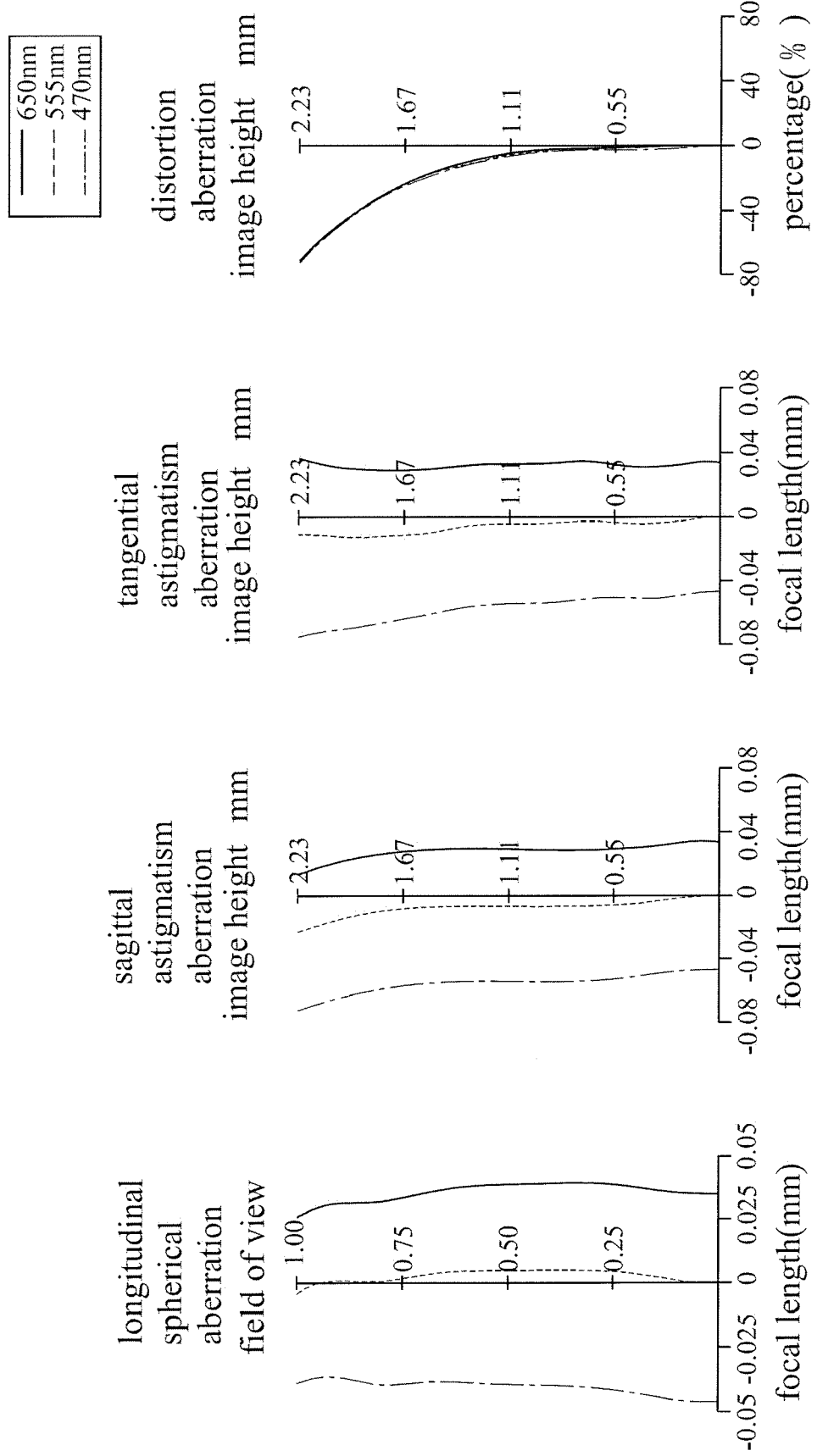
FIGS. 22(a) to 22(d) show different optical characteristics of the imaging lens of the fifth preferred embodiment.

Referring to FIG. 19, the fifth preferred embodiment of the imaging lens 10 of this invention is shown to have a configuration similar to that of the first preferred embodiment.

Shown in FIG. 20 is a table that lists values of some optical parameters corresponding to the surfaces 31-81, 32-82 of the fifth preferred embodiment. The imaging lens 10 has an overall system focal length of 1.270 mm, an HFOV of 81.304°, an F-number of 2, and a system length of 34.986 mm.

Shown in FIG. 21 is a table that lists values of some aspherical parameters corresponding to the surfaces 41-71, 42-72 of the aforementioned relationship (1) corresponding to the fifth preferred embodiment.

Relationships among some of the aforementioned lens parameters corresponding to the fifth preferred embodiment are listed in FIG. 31.

FIGS. 22(a) to 22(d) respectively show simulation results corresponding to longitudinal spherical aberration, sagittal astigmatism aberration, tangential astigmatism aberration, and distortion aberration of the fifth preferred embodiment. It can be understood from FIGS. 22(a) to 22(d) that the fifth preferred embodiment is able to achieve a relatively good optical performance.

Figure 23:
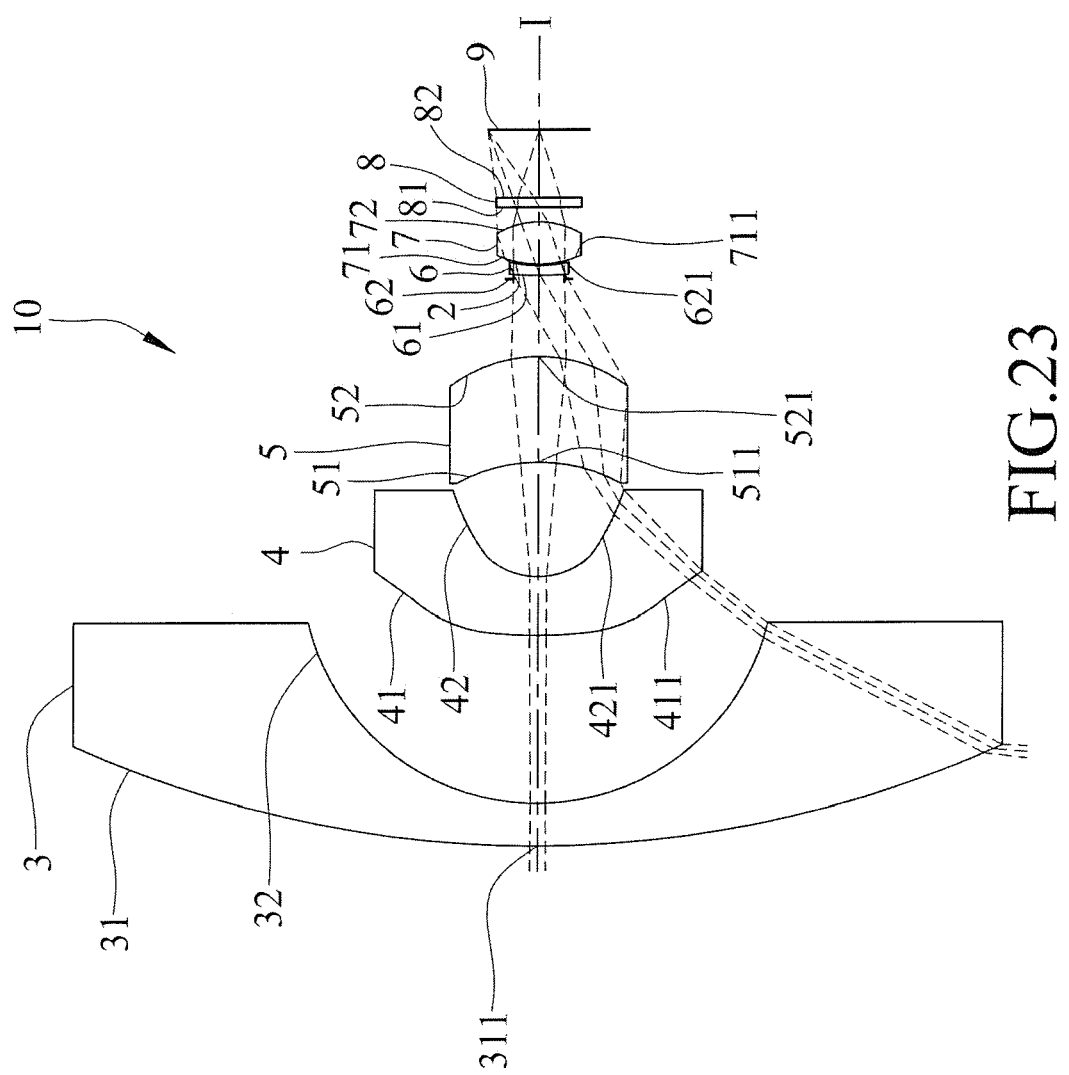
FIG. 23 is a schematic diagram that illustrates a sixth preferred embodiment of an imaging lens according to the present invention.
Figure 26:
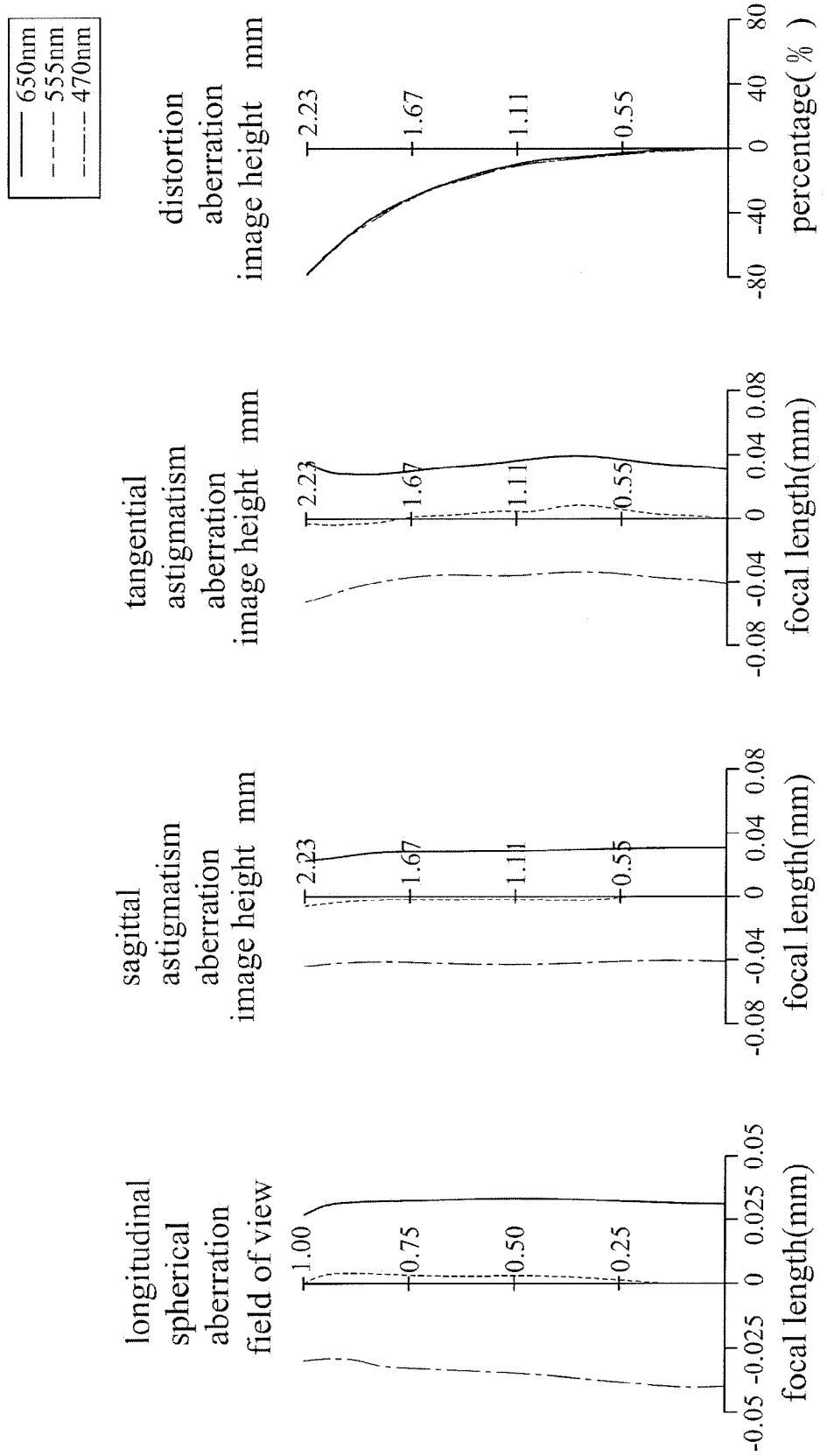
FIGS. 26(a) to 26(d) show different optical characteristics of the imaging lens of the sixth preferred embodiment.

FIG. 23 illustrates the sixth preferred embodiment of an imaging lens 10 according to the present invention, which has a configuration similar to that of the first preferred embodiment.

Shown in FIG. 24 is a table that lists values of some optical parameters corresponding to the surfaces 31-81, 32-82 of the sixth preferred embodiment. The imaging lens 10 has an overall system focal length of 1.219 mm, an HFOV of 83.164°, an F-number of 2, and a system length of 34.998 mm.

Shown in FIG. 25 is a table that lists values of some aspherical parameters corresponding to the surfaces 41-71, 42-72 of the aforementioned relationship (1) corresponding to the sixth preferred embodiment.

Relationships among some of the aforementioned lens parameters corresponding to the sixth preferred embodiment are illustrated in FIG. 31.

FIGS. 26(a) to 26(d) respectively show simulation results corresponding to longitudinal spherical aberration, sagittal astigmatism aberration, tangential astigmatism aberration, and distortion aberration of the sixth preferred embodiment. It can be understood from FIGS. 26(a) to 26(d) that the sixth preferred embodiment is able to achieve a relatively good optical performance.

Figure 27:
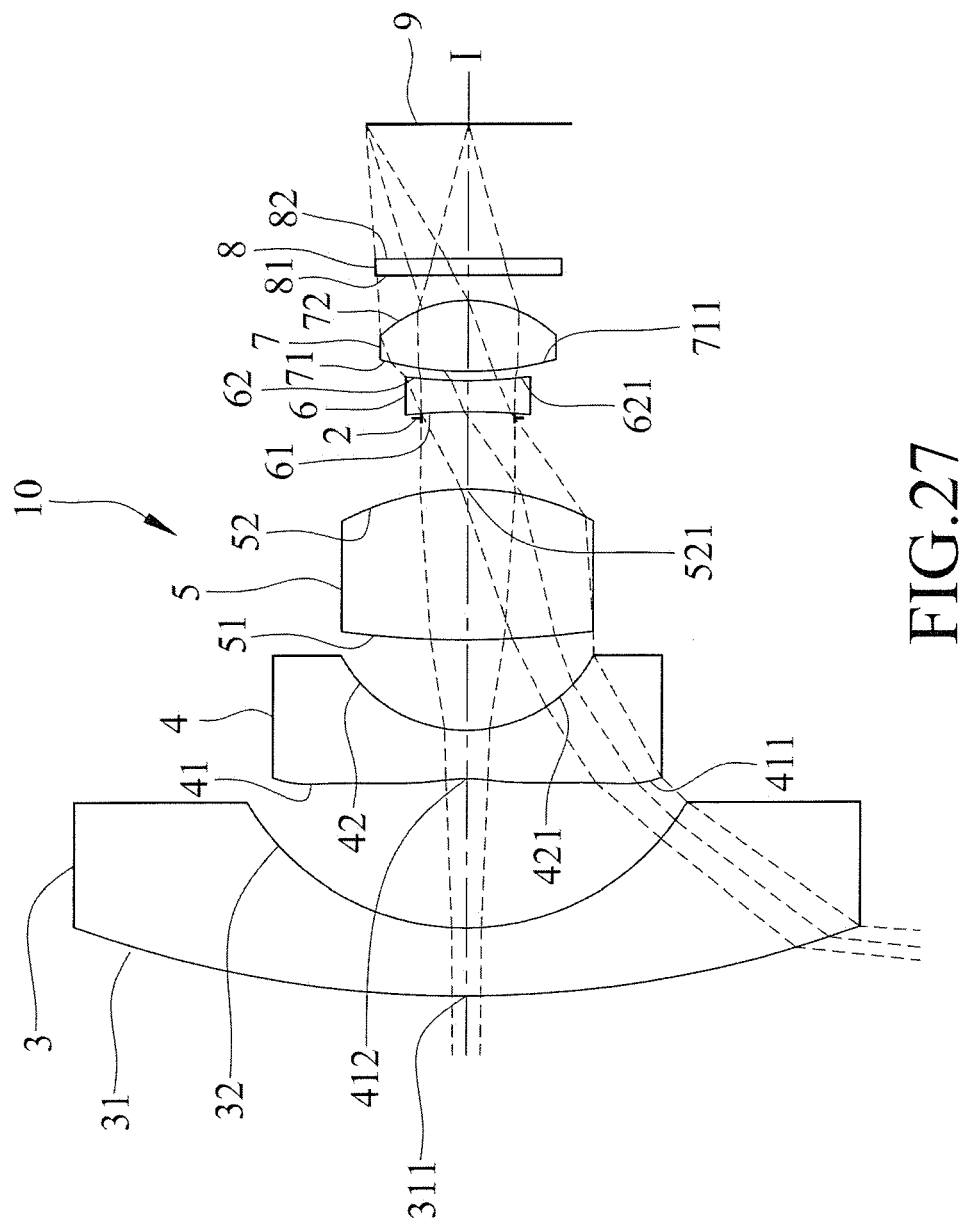
FIG. 27 is a schematic diagram that illustrates a seventh preferred embodiment of an imaging lens according to the present invention.
Figure 30:
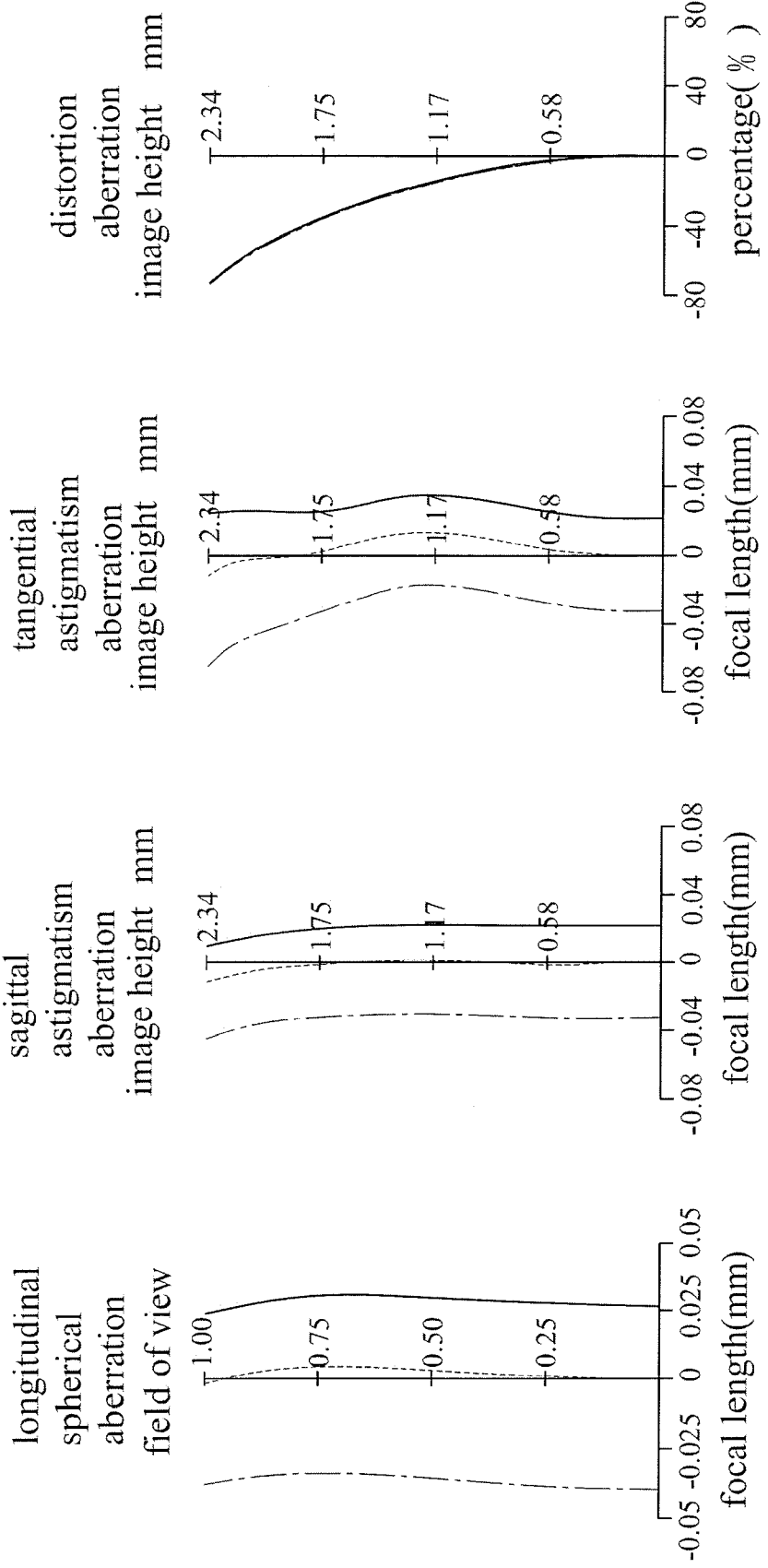
FIGS. 30(a) to 30(d) show different optical characteristics of the imaging lens of the seventh preferred embodiment.

Referring to FIG. 27, the differences between the first and seventh preferred embodiments of the imaging lens 10 of this invention reside in that: the object-side surface 41 of the second lens element 4 has a concave portion 412 in a vicinity of the optical axis (I), and a convex portion 411 in a vicinity of a periphery of the second lens element 4. Moreover, the object-side surface 51 of the third lens element 5 is a convex surface, and the object-side surface 61 of the fourth lens element 6 is a concave surface.

Shown in FIG. 28 is a table that lists values of some optical parameters corresponding to the surfaces 31-81, 32-82 of the seventh preferred embodiment. The imaging lens 10 has an overall system focal length of 1.343 mm, an HFOV of 83.6431°, an F-number of 2, and a system length of 20.613 mm.

Shown in FIG. 29 is a table that lists values of some aspherical parameters corresponding to the surfaces 41-71, 42-72 of the aforementioned relationship (1) corresponding to the seventh preferred embodiment.

Relationships among some of the aforementioned lens parameters corresponding to the seventh preferred embodiment are listed in FIG. 31.

FIGS. 30(a) to 30(d) respectively show simulation results corresponding to longitudinal spherical aberration, sagittal astigmatism aberration, tangential astigmatism aberration, and distortion aberration of the seventh preferred embodiment. It can be understood from FIGS. 30(a) to 30(d) that the seventh preferred embodiment is able to achieve a relatively good optical performance.

Shown in FIG. 31 is a table that lists the aforesaid relationships among some of the aforementioned lens parameters corresponding to the seven preferred embodiments for comparison. When each of the optical parameters of the imaging lens 10 according to this invention satisfies the following relationships, the optical performance is still relatively good even with a wide field of view:

(1) EFL/CT1≤2.50: Since reduction in EFL favors enlargement of field-of-view while the first lens element 3 has a relatively large effective optical diameter, the reducible ratio of EFL is relatively large and a reducible ratio of CT1 is relatively small. Preferably, 0.1≤EFL/CT1≤2.5.

(2) (AC12+AC45)/AC34≤8.50: Considering the optical path for the imaging lens 10, better arrangement for facilitating reduction of the system length may be achieved when this relationship is satisfied. Preferably, $0.8 \leq (AC12+AC45)/AC34 \leq 8.5$.

(3) $EFL/AC23 \leq 0.7$: Reduction in EFL favors enlargement of field-of-view, while reduction of AC23 is limited in consideration of the optical path. Thus, a reducible ratio of EFL is relatively large and a reducible ratio of AC23 is relatively small. Preferably, $0.1 \leq EFL/AC23 \leq 0.7$.

(4) $BFL/AC34 \leq 3.00$: Reduction in BFL favors reduction of overall length of the imaging lens 10, while reduction of AC34 is limited in consideration of the optical path. Thus, a reducible ratio of BFL is relatively large and a reducible ratio of AC34 is relatively small. Preferably, $0.7 \leq BFL/AC34 \leq 3$.

(5) $3.00 \leq (CT1+AC23)/CT5$: Considering a relatively large effective optical diameter of the first lens element 3 and the optical path, reducible ratios of CT1 and AC23 are limited to be relatively small. Since the fifth lens element 7 has a relatively small effective optical diameter, a reducible ratio of CT5 is relatively large. Preferably, $3.00 \leq (CT1+AC23)/CT5 \leq 15$.

(6) $CT3/CT1 \leq 2.50$: Since the third lens element 5 has a relatively small effective optical diameter and the first lens element 3 has a relatively large effective optical diameter, a reducible ratio of CT3 is relatively large and a reducible ratio of CT1 is relatively small. Preferably, $0.5 \leq CT3/CT1 \leq 2.50$.

(7) $CT2/AC34 \leq 1.50$: Since the second lens element 4 has a relatively small effective optical diameter, a reducible ratio of CT2 is relatively large. Considering the optical path, the reducible ratio of AC34 is limited to be relatively small. Preferably, $0.15 \leq CT2/AC34 \leq 1.5$.

(8) $3.00 \leq (CT1+AC23)/EFL$: As mentioned above, reducible ratios of CT1 and AC23 are relatively small, and a reducible ratio of EFL is relatively large. Preferably, $3.00 \leq (CT1+AC23)/EFL \leq 10.50$.

(9) $BFL/AC23 \leq 2.00$: As mentioned above, a reducible ratio of BFL is relatively large and a reducible ratio of AC23 is relatively small. Preferably, $0.50 \leq BFL/AC23 \leq 2.00$.

(10) $(AC12+AC45)/AC23 \leq 5.00$: Considering optical path, better arrangement for facilitating reduction of the system length may be achieved when this relationship is satisfied. Preferably, $0.50 \leq (AC12+AC45)/AC23 \leq 5.00$.

(11) $CT3/AC34 \leq 4.00$: As mentioned above, a reducible ratio of CT3 is relatively large and a reducible ratio of AC34 is relatively small. Better arrangement may be achieved when this relationship is satisfied. Preferably, $0.3 \leq CT3/AC34 \leq 4.00$.

(12) $CT5/CT1 \leq 1.5$: As mentioned above, a reducible ratio of CT5 is relatively large and a reducible ratio of CT1 is relatively small. Better arrangement may be achieved when CT5/CT1 has the upper limit. Preferably, $0.2 \leq CT5/CT1 \leq 1.5$.

(13) $CT3/AC23 \leq 2.00$: As mentioned above, a reducible ratio of CT3 is relatively large and a reducible ratio of AC23 is relatively small. Better arrangement may be achieved when CT3/AC23 has the upper limit. Preferably, $0.3 \leq CT3/AC23 \leq 2$.

(14) $EFL/AC34 \leq 1.00$: As mentioned above, a reducible ratio of EFL is relatively large and a reducible ratio of AC34 is relatively small. Better arrangement may be achieved when EFL/AC34 has the upper limit. Preferably, $0.2 \leq EFL/AC34 \leq 1.00$.

(15) $2.30 \leq (CT1+AC23)/CT2$: As mentioned above, reducible ratios of CT1 and AC23 are relatively small and a reducible ratio of CT2 is relatively large. Preferably, $2.30 \leq (CT1+AC23)/CT2 \leq 6.00$.

To sum up, effects and advantages of the imaging lens 10 according to the present invention are described hereinafter.

1. The object-side surface 31 of the first lens element 3 having a convex portion 311 may enhance converging ability and favors reduction of the system length of the imaging lens 10. The fifth lens element 7 with the positive refractive power provides positive refractive power for the imaging lens 10. Further, by virtue of cooperation of the convex portion 311, the convex portion 411, the concave portion 421, the convex portion 521, the concave portion 621, and the convex portion 711, image quality of the imaging lens 10 can be ensured. Since the fifth lens element 7 is made of a plastic material, weight and cost of the imaging lens 10 may be reduced. In addition, when the object-side surface 51 of the third lens element 5 has the concave portion 511 in a vicinity of the optical axis (I), image quality of the imaging lens 10 may be further enhanced.

2. Through design of the relevant optical parameters, such as EFL/CT1, (AC12+AC45)/AC34, EFL/AC23, BFL/AC34, (CT1+AC23)/CT5, CT3/CT1, CT2/AC34, (CT1+AC23)/EFL, BFL/AC23, (AC12+AC45)/AC23, CT3/AC34, CT5/CT1, CT3/AC23, EFL/AC34, and (CT1+AC23)/CT2, optical aberrations, such as spherical aberration, may be reduced or even eliminated. Further, through surface design and arrangement of the lens elements 3-7, even with the increased field of view, optical aberrations may still be reduced or even eliminated, resulting in relatively good optical performance.

3. Through the aforesaid seven preferred embodiments, it is known that the half field-of-view of this invention may be increased up to above 81.304°. As compared to the conventional imaging lens, the present invention provides a relatively large field of view so as to facilitate developing relevant products with a wider angle, and to meet market requirements.

Figure 32:
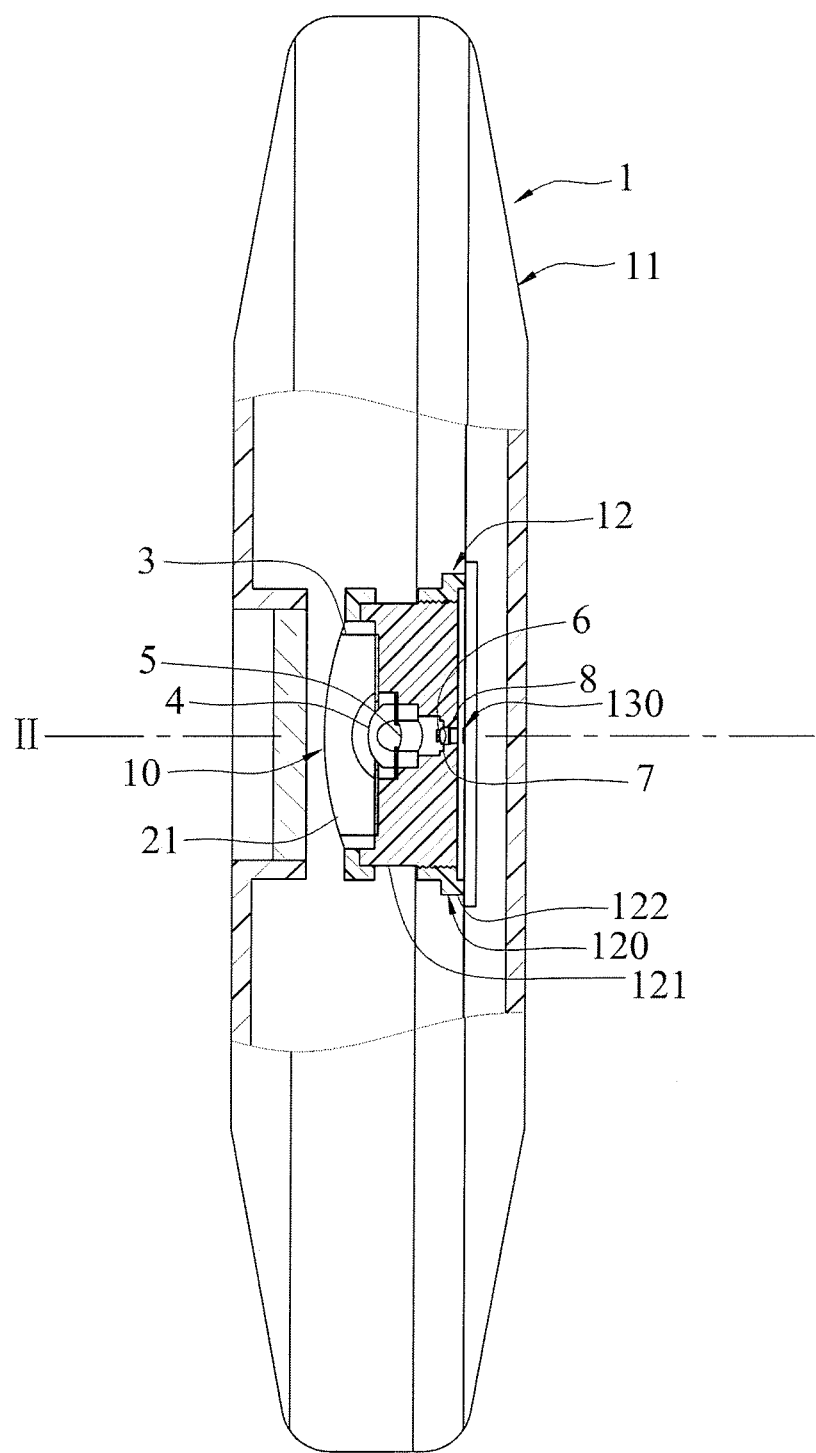
FIG. 32 is a schematic partly sectional view to illustrate an exemplary application of the imaging lens of the present invention.

Shown in FIG. 32 is an exemplary application of the imaging lens 10, in which the imaging lens 10 is disposed in a housing 11 of an electronic apparatus 1 (such as a monitoring device, but not limited thereto), and forms a part of an imaging module 12 of the electronic apparatus 1. The imaging module 12 includes a barrel 21 on which the imaging lens 10 is disposed, a holder unit 120 on which the barrel 21 is disposed, and an image sensor 130 disposed at the image plane 9 (see FIG. 2).

The holder unit 120 includes a first holder portion 121 in which the barrel 21 is disposed, and a second holder portion 122 having a portion interposed between the first holder portion 121 and the image sensor 130. The barrel 21 and the first holder portion 121 of the holder unit 120 extend along an axis (II), which coincides with the optical axis (I) of the imaging lens 10. It should be noted that the image sensor 130 in this embodiment is packaged using chip on board (COB) techniques or chip scale package (CSP), while other packaging techniques may be employed in other embodiments of this invention.

By virtue of the imaging lens 10 of the present invention, the electronic apparatus 1 in the exemplary application may be configured to have a relatively wide field of view and to maintain a thin overall thickness with good optical and imaging performance, so as to reduce cost of materials, and to satisfy market requirements of wide-angle products.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising a first lens element, a second lens element, a third lens element, a fourth lens element and a fifth lens element arranged in order from an object side to an image side along an optical axis of said imaging lens, each of said first lens element, said second lens element, said third lens element, said fourth lens element and said fifth lens element having an object-side surface facing toward the object side, and an image-side surface facing toward the image side, wherein:

said object-side surface of said first lens element has a convex portion in a vicinity of the optical axis;

said object-side surface of said second lens element has a convex portion in a vicinity of a periphery of said second lens element, and said image-side surface of said second lens element has a concave portion in a vicinity of the periphery of said second lens element;

said image-side surface of said third lens element has a convex portion in a vicinity of the optical axis;

said image-side surface of said fourth lens element has a concave portion in a vicinity of a periphery of said fourth lens element;

said fifth lens element has a positive refractive power and is made of a plastic material, said object-side surface of said fifth lens element having a convex portion in a vicinity of a periphery of said fifth lens element; and said imaging lens does not include any lens element with refractive power other than said first lens element, said second lens element, said third lens element, said fourth lens element and said fifth lens element, wherein the imaging lens satisfies EFL/AC23≤0.7, where EFL represents a system focal length of said imaging lens and AC23 represents an air gap length between said second lens element and said third lens element at the optical axis.

2. The imaging lens as claimed in claim 1, satisfying EFL/CT1≤2.50, where CT1 represents a thickness of said first lens element at the optical axis.

3. The imaging lens as claimed in claim 2, further satisfying (AC12+AC45)/AC34≤8.50, where AC12 represents an air gap length between said first lens element and said second lens element at the optical axis, AC45 represents an air gap length between said fourth lens element and said fifth lens element at the optical axis, and AC34 represents an air gap length between said third lens element and said fourth lens element at the optical axis.

4. The imaging lens as claimed in claim 3, further satisfying BFL/AC34≤3.00, where BFL represents a distance at the optical axis between said image-side surface of said fifth lens element and an image plane at the image side.

5. The imaging lens as claimed in claim 4, further satisfying 3.00≤(CT1+AC23)/CT5, where AC23 represents an air gap length between said second lens element and said third lens element at the optical axis, and CT5 represents a thickness of said fifth lens element at the optical axis.

6. The imaging lens as claimed in claim 1, satisfying CT3/CT1≤2.50, where CT3 represents a thickness of said third lens element at the optical axis, and CT1 represents a thickness of said first lens element at the optical axis.

7. The imaging lens as claimed in claim 6, further satisfying CT2/AC34≤1.50, where CT2 represents a thickness of said second lens element at the optical axis, and AC34 represents an air gap length between said third lens element and said fourth lens element at the optical axis.

8. The imaging lens as claimed in claim 7, further satisfying 3.00≤(CT1+AC23)/EFL.

9. The imaging lens as claimed in claim 7, further satisfying BFL/AC23≤2.00, where BFL represents a distance at the optical axis between said image-side surface of said fifth lens element and an image plane at the image side, and AC23 represents an air gap length between said second lens element and said third lens element at the optical axis.

10. The imaging lens as claimed in claim 9, wherein said object-side surface of said third lens element further has a concave portion in a vicinity of the optical axis.

11. The imaging lens as claimed in claim 1, satisfying (AC12+AC45)/AC23≤5.00, where AC12 represents an air gap length between said first lens element and said second lens element at the optical axis, and AC45 represents an air gap length between said fourth lens element and said fifth lens element at the optical axis.

12. The imaging lens as claimed in claim 11, further satisfying CT3/AC34≤4.00, where CT3 represents a thickness of said third lens element at the optical axis, and AC34 represents an air gap length between said third lens element and said fourth lens element at the optical axis.

13. The imaging lens as claimed in claim 12, further satisfying CT5/CT1≤1.50, where CT5 represents a thickness of said fifth lens element at the optical axis, and CT1 represents a thickness of said first lens element at the optical axis.

14. The imaging lens as claimed in claim 1, satisfying CT3/AC34≤2.00, where CT3 represents a thickness of said third lens element at the optical axis.

15. The imaging lens as claimed in claim 14, further satisfying EFL/AC34≤1.00, where EFL represents a system focal length of said imaging lens, and AC34 represents an air gap length between said third lens element and said fourth lens element at the optical axis.

16. The imaging lens as claimed in claim 15, further satisfying 2.30≤(CT1+AC23)/CT2, where CT1 represents a thickness of said first lens element at the optical axis, and CT2 represents a thickness of said second lens element at the optical axis.

17. An electronic apparatus comprising:
a housing; and
an imaging module disposed in said housing, and including an imaging lens as claimed in claim 1, a barrel on which said imaging lens is disposed, a holder unit on which said barrel is disposed, and an image sensor disposed at the image side of said imaging lens.

* * * * *